United States Patent
Brainard et al.

(10) Patent No.: US 8,895,691 B2
(45) Date of Patent: Nov. 25, 2014

(54) ACID-LABILE POLYMERS AND MONOMERS FOR THEIR CONSTRUCTION

(75) Inventors: Robert L. Brainard, Albany, NY (US); Brian Cardineau, West Islip, NY (US)

(73) Assignee: The Research Foundation of State University of New York, Albany, NY (US)

( * ) Notice: Subject to any disclaimer, the term of this patent is extended or adjusted under 35 U.S.C. 154(b) by 151 days.

(21) Appl. No.: 12/869,202

(22) Filed: Aug. 26, 2010

(65) Prior Publication Data

US 2011/0152496 A1 Jun. 23, 2011

Related U.S. Application Data

(60) Provisional application No. 61/237,164, filed on Aug. 26, 2009.

(51) Int. Cl.
- *C08G 63/06* (2006.01)
- *C08G 63/54* (2006.01)
- *C08G 63/672* (2006.01)
- *C08G 63/56* (2006.01)
- *C08G 63/40* (2006.01)
- *C08G 63/19* (2006.01)
- *C08G 73/00* (2006.01)

(52) U.S. Cl.
CPC .............. *C08G 63/19* (2013.01); *C08G 63/54* (2013.01); *C08G 63/672* (2013.01); *C08G 63/56* (2013.01); *C08G 63/40* (2013.01)
USPC ........... 528/361; 528/272; 528/367; 528/372; 430/270.1

(58) Field of Classification Search
CPC ...... C08G 63/19; C08G 63/40; C08G 63/672; C08G 63/54; C08G 63/56
USPC .................................. 528/272, 306
See application file for complete search history.

(56) References Cited

U.S. PATENT DOCUMENTS

| | | | | |
|---|---|---|---|---|
| 8,137,700 B2 * | 3/2012 | Frechet et al. | ................. | 424/501 |
| 2007/0027268 A1 * | 2/2007 | Di et al. | ........................ | 525/439 |
| 2009/0278293 A1 * | 11/2009 | Yoshinaka et al. | ........ | 267/140.11 |

FOREIGN PATENT DOCUMENTS

| | | | |
|---|---|---|---|
| WO | WO 2007/026653 | * | 3/2007 |
| WO | WO 2007/131193 | * | 11/2007 |
| WO | 2009105667 | | 8/2009 |

OTHER PUBLICATIONS

Frechet et al. "Self-developing imaging systems based on polyesters and polyethers" Polymeric Materials Science and Engineering, 1989,60, pp. 170-173.*
U.S. Appl. No. 12/918,647, filed Aug. 20, 2010 (Not yet published).
U.S. Appl. No. 12/869,220, filed Aug. 26, 2010 (Not yet published).
U.S. Appl. No. 12/869,308, filed Aug. 26, 2010 (Not yet published).

* cited by examiner

*Primary Examiner* — Ling Choi
*Assistant Examiner* — Gennadiy Mesh
(74) *Attorney, Agent, or Firm* — Heslin Rothenberg Farley & Mesiti P.C.

(57) ABSTRACT

Polymers for photoresists and monomers for incorporation into those polymers are disclosed. The polymers comprise at least two components: an acid labile component and a photolytically stable and acid-stable component. The polymers may also contain a third, photoacid generator (PAG) component. The acid-labile component is based on the presence of a readily cleavable oxygen-carbon bond that usually occurs in a sterically hindered ether or ester.

9 Claims, No Drawings

ACID-LABILE POLYMERS AND MONOMERS FOR THEIR CONSTRUCTION

CROSS REFERENCE TO RELATED APPLICATION

This application claims benefit of priority from U.S. Provisional Patent Application No. 61/237,164, filed Aug. 26, 2009, the entire contents of which are incorporated herein by reference.

FIELD OF THE INVENTION

The invention relates to polymers for photoresists and to monomers for incorporation into those polymers. The polymers comprise at least two components: an acid labile component and a photolytically stable and acid-stable component. The acid-labile component is based on the presence of a readily cleavable oxygen-carbon bond that usually occurs in a sterically hindered ether or ester.

BACKGROUND OF THE INVENTION

Extreme Ultraviolet (EUV, 13.5 nm) imaging technology continues to be the primary option for the 22 nm microelectronics node. However, EUV resist performance remains one of the largest barriers to EUV technology implementation, because it is difficult to simultaneously meet performance targets for resolution, line width roughness (LWR) and sensitivity. For example, low concentrations of acid during imaging will yield rough lines (high LWR), but good sensitivity; high concentrations of acid will give smoother lines, but poor sensitivity. To break through to a new level of performance, new materials must be developed that will make improvements toward one performance target without compromising the performance of the other two.

Acid-cleavable polymers are known in the art. In an early approach to a deep ultraviolet (DUV or 248 nm) photoresist or a 193 nm photoresist, the polymer has an ester with a side-chain blocking group (e.g. t-butyl) that can be removed with catalytic acid, and a photoacid generator (PAG) is randomly dissolved within the polymer film, so that exposure to actinic radiation yields a developer-soluble carboxylic acid. Typical first-generation ionic PAGs are sulfonium and iodonium salts. These resists are relatively inexpensive and simple to prepare using standard formulation methods. The resists have high sensitivity because acids are free to diffuse through the film, catalyzing acidolysis reactions (removal of ester blocking group) with large turnover numbers. In a second approach, for which the monomers of the present invention are also useful, the photogenerated acid is integrated into the polymer chain. This approach is described in PCT application PCT/US09/34707 filed Feb. 20, 2009, which is incorporated herein by reference. PCT/US09/34707 relates to a resist system based on a polymer with PAG and ester functionality located within the main polymer chain. When the PAG breaks apart photochemically or the ester-linkages break apart by acidolysis, the molecular weight of the polymer decreases, allowing for higher acid diffusion during bake and faster resist dissolution during development. The polymer of PCT/US09/34707 is referred to as a chain scission polyester PAG-polymer (CSP³). With CSP³ the photochemical reaction breaks the polymer chain and produces a polymer-bound acid at a chain end. Then, the photogenerated acid catalyzes the transformation of the ester to the developer-soluble carboxylic acid by once again breaking the polymer chain. For either approach—PAG dispersed in resin or PAG incorporated in polymer—the monomers of the present invention provide additional acid-cleavage sites. The resulting areas of the resist exposed to light and subjected to acidolysis reactions have much lower molecular weight resulting from the chain scission reactions. This provides lower Tg, higher acid diffusion rates, and faster dissolution rates.

SUMMARY OF THE INVENTION

In one aspect, the invention disclosed herein relates to a polymer comprising at least a first component and a second component. The first component is photolytically stable and acid-stable. The second component is chosen from units of the formulae

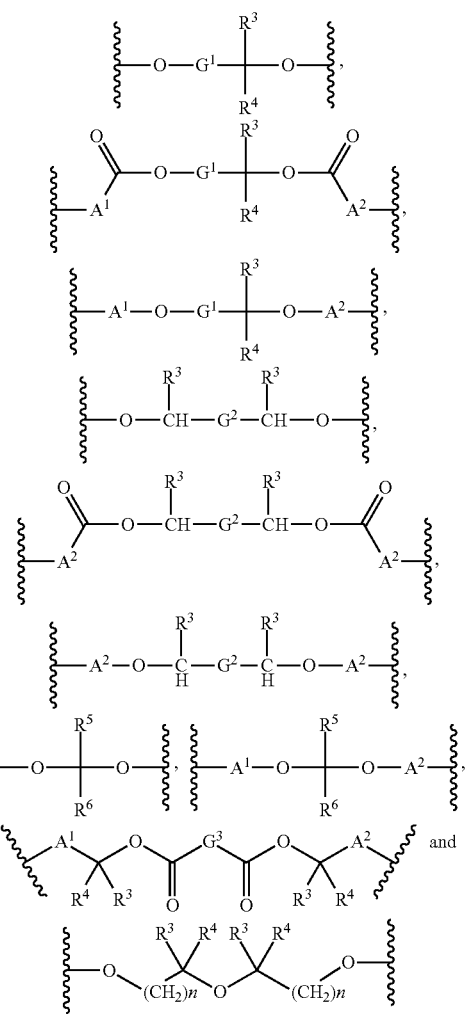

wherein
$R^3$ and $R^4$ are independently chosen from $(C_1-C_6)$alkyl, or $R^3$ and $R^4$ together with the carbon to which they are attached form a cyclopentane or cyclohexane ring;
$R^5$ and $R^6$ are independently chosen from H, $(C_1-C_6)$alkyl, phenyl and tolyl, or $R^5$ and $R^6$ together with the carbon to which they are attached form a $(C_3-C_7)$carbocycle;
$G^1$ is selected from $(C_1-C_{20})$hydrocarbon and fluoro$(C_1-C_{20})$hydrocarbon;
$G^2$ is an unsaturated $(C_2-C_{10})$hydrocarbon;
$G^3$ is selected from direct bond, $(C_1-C_{20})$hydrocarbon and fluoro$(C_1-C_{20})$hydrocarbon;

$A^1$ and $A^2$ are independently chosen from $(C_1-C_{20})$hydrocarbon, fluoro$(C_1-C_{20})$hydrocarbon, $(C_1-C_{20})$hydrocarbon ether, $(C_1-C_6)$oxaalkyl, $(C_1-C_6)$thiaalkyl, $(C_1-C_6)$azaalkyl and acylated $(C_1-C_6)$azaalkyl, each of the foregoing terminating in —O—, —S— or —NR$^9$—, wherein R$^9$ is H, $(C_1-C_6)$alkyl or benzyl; and n is 1 to 4.

In a second aspect, the invention relates to monomers useful for preparing the polymers described above. The monomers have the formulae

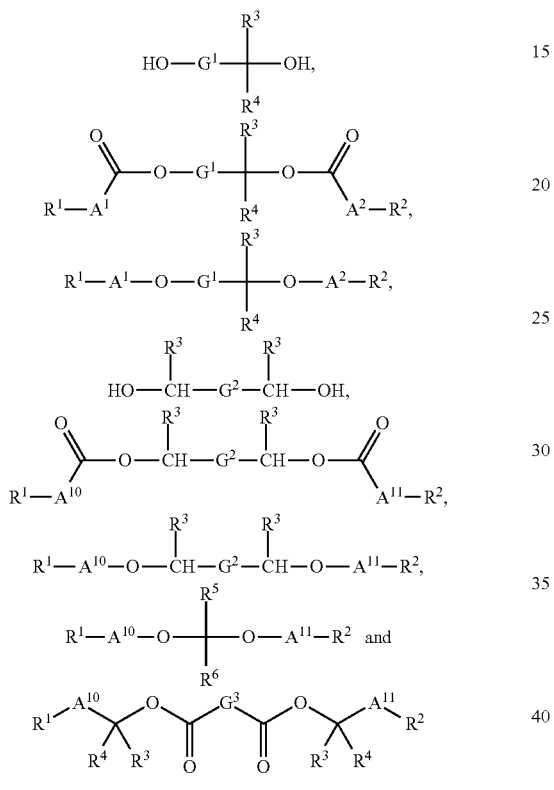

wherein

R$^1$ and R$^2$ are chosen independently from —OH, —NH$_2$, —Cl, —Br, —SO$_2$Cl, —N=C=O and —COCl; and the remaining variables are as previously defined.

In a further aspect, the invention relates to a method for patterning a substrate comprising:
(a) depositing a polymer as described above on a surface of a substrate;
imagewise exposing the polymer on the surface to actinic radiation; and
developing the exposed polymer to remove portions of the polymer.

In a further aspect, the invention relates to a method for making a semiconductor device comprising:
(a) depositing a polymer as described above on a surface of a substrate;
imagewise exposing the polymer on the surface to actinic radiation;
developing the exposed polymer to remove portions of the polymer and expose portions of the surface;
altering the surface of the substrate; and
removing remaining polymer from the surface.

In a further aspect, the invention relates to a semiconductor device produced by the foregoing method.

In further aspects, the invention relates to a photoresist formulation comprising a solvent and a polymer as described above and to a photoresist comprising a polymer as described above.

DETAILED DESCRIPTION OF THE INVENTION

In one aspect, the invention disclosed herein relates to a polymer comprising at least a first component and a second component. The first component is photolytically stable and acid-stable. The second component is chosen from units of the formulae

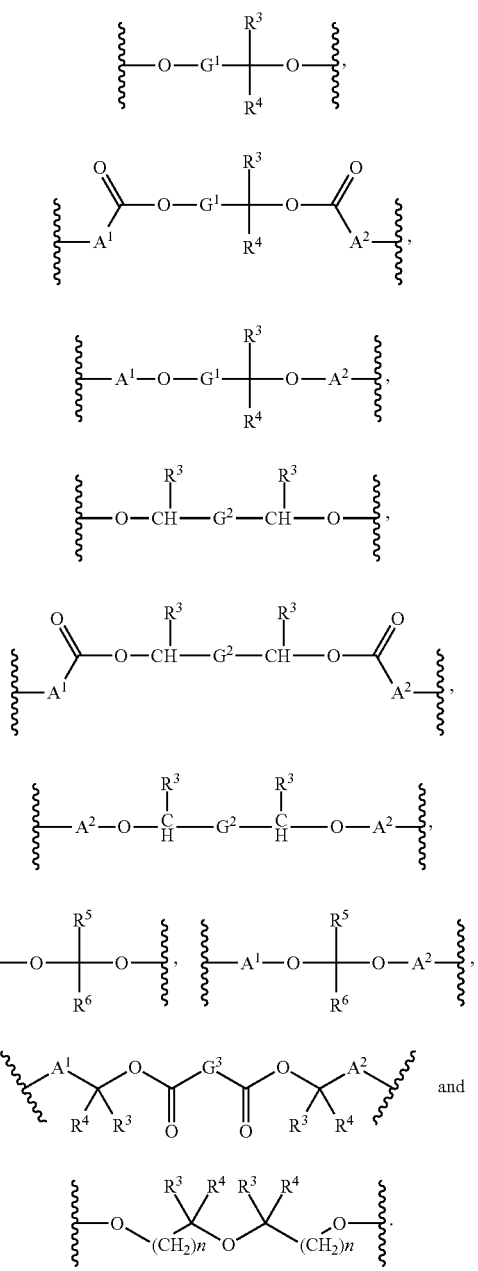

The polymer may contain mixtures of various repeating units described herein. It may also contain other repeating units in addition to those described herein. Indeed, the polymer may comprise predominantly other repeating units. As long as a polymer contains a residue corresponding to the "first component" and the "second component" described herein, the polymer is to be considered within the scope of the invention. Preferably each polymer chain contains at least two recurrences of each first and second component. As a practical consideration, the polymer will usually contain a sufficient plurality of the second component to allow for fragmentation of the polymer in a convenient time frame to be useful for photolithography. In most embodiments, the polymers have molecular weights of 6,000 g/mol or greater, and they contain 10 or more residues of the second component.

In one subgenus, the units are of formula

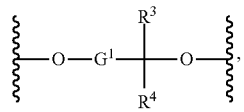

1.

-continued

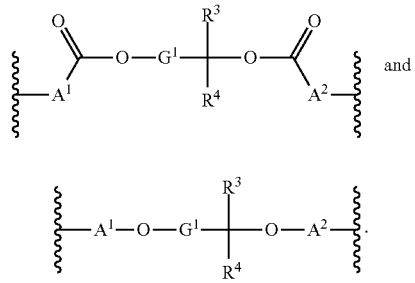

Embodiments of polymers in this subgenus include those in which $R^3$ and $R^4$ are both methyl. In other embodiments, $G^1$ is chosen from $(C_1-C_6)$alkyl, methylcyclohexyl and methylcyclohexenyl. Examples of $G^1$ include:

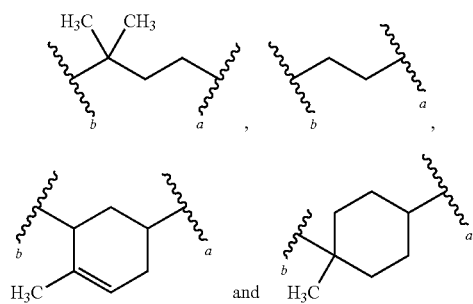

in which "a" designates the point of attachment to the carbon that bears $R^3$ and $R^4$ and "b" designates the point of attachment to oxygen. In some embodiments $A^1$ and $A^2$ are chosen from amino-terminal or oxy-terminal-$(C_1-C_4)$alkylene-, —$(C_2-C_4)$azaalkylene-, —$(C_2-C_4)$N-acetylazaalkylene-, 4-methylbenzyloxymethylene, 4-methylbenzyloxy ethylene, 4-methylbenzyl and phenylethenyl. An example of an amino-terminal-$(C_1-C_4)$alkylene- would be —HN—CH$_2$— and the resulting repeating unit of the polymer would be:

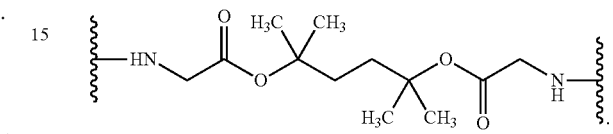

Similarly, an example of an oxy-terminal —$(C_2-C_4)$ azaalkylene- would be —OCH$_2$CH$_2$NHCH$_2$— and the resulting repeating unit of the polymer would be:

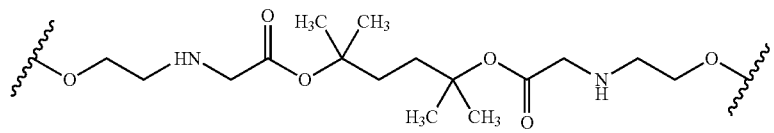

The common structural feature of the three families in this subgenus is

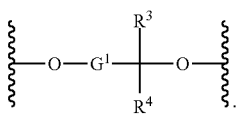

This may be thought of as the residue of a diol monomer

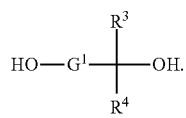

Although these diol residues can be incorporated directly into a polymer, it is often found that polymerization reactions of tertiary alcohols to produce the polymer (e.g. polyester, polyurethane, polyether) are sluggish. The benefit (acid cleavage) of the residue can be preserved and the reactivity improved by first reacting the diol with a reagent that carries a primary alcohol, amine or thiol at its terminus. This maneuver provides two advantages. First, the less sterically hindered functionality of the extended monomer allows more rapid polymerizations and, second, the additional functionality opens the door to a wider range of polymers, e.g. polyamides and polyureas.

For example, in theory 2,5-dimethylhexane-2,5-diol

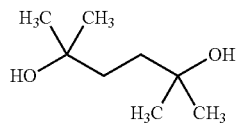

(formula 1: $G^1 =\!\!=\!\!C(CH_3)_2CH_2CH_2\!\!-\!\!$ and $R^3$ and $R^4$ are methyl) could be reacted with adipoyl chloride to provide the polyester

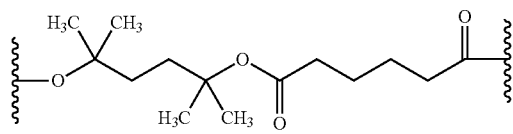 [SMILES: *OC(C)(C)CCC(C)(C)OC(=O)CCCCC(*)=O]

Alternatively, the primary diol made from 2,5-dimethylhexane-2,5-diol by the formal addition of hydroxyacetate (actually synthesized by chloroacetyl chloride addition and hydrolysis) (formula 2: $G^1 =\!\!=\!\!C(CH_3)_2CH_2CH_2\!\!-\!\!$; $R^3 =\!\!= R^4 =\!\!=$ methyl; $A^1 =\!\!= A^2 =\!\!=\!\!-CH_2O\!\!-\!\!$)

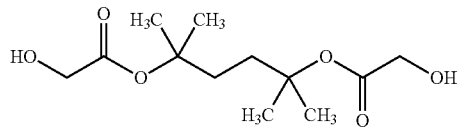 [SMILES: CC(C)(CCC(C)(C)OC(=O)CO)OC(=O)CO]

will provide more rapid polymerization, and the diamine made from 2,5-dimethylhexane-2,5-diol by the formal addition of glycine (formula 2: $G^1 =\!\!=\!\!C(CH_3)_2CH_2CH_2\!\!-\!\!$; $R^3 =\!\!= R^4 =\!\!=$ methyl; $A^1 =\!\!= A^2 =\!\!=\!\!-CH_2NH\!\!-\!\!$)

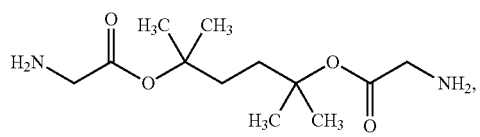 [SMILES: CC(C)(CCC(C)(C)OC(=O)CN)OC(=O)CN]

when reacted with adipoyl chloride, will provide polyamide resins. Similarly, an adduct of 2,5-dimethylhexane-2,5-diol with 2-bromoethanol (formula 3: $G^1 =\!\!=\!\!C(CH_3)_2CH_2CH_2\!\!-\!\!$; $R^3 =\!\!= R^4 =\!\!=$ methyl; $A^1 =\!\!= A^2 =\!\!=\!\!-CH_2CH_2O\!\!-\!\!$)

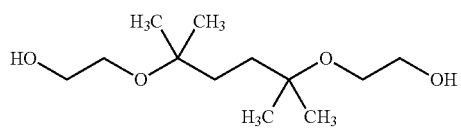

can provide more rapid polymerization with adipoyl chloride.
In a second subgenus, the units are of formulae

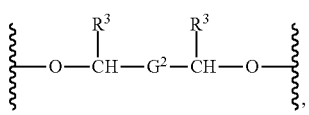
4.

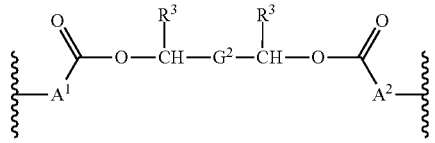
5.

and

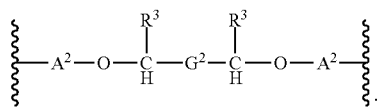
6.

Embodiments of polymers in this subgenus include those in which $R^3$ is methyl. In other embodiments, $G^2$ is chosen from phenylene, ethynyl and ethenyl. Examples of 4. include:

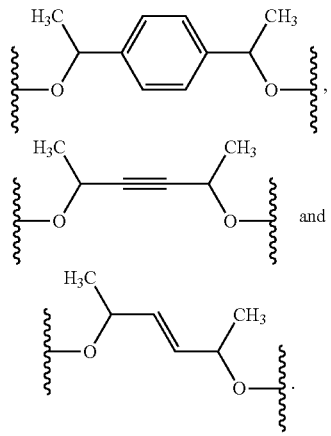

The common structural feature of the three families in this subgenus is

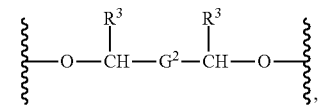

and the diol precursor may be extended in a parallel fashion to that described above for formulae 1, 2 and 3. In some embodiments $A^1$ and $A^2$ are chosen from amino-terminal or oxy-terminal-$(C_1\text{-}C_4)$alkylene-, —$(C_2\text{-}C_4)$azaalkylene-, —$(C_2\text{-}C_4)$N-acetylazaalkylene-, 4-methylbenzyloxymethylene, 4-methylbenzyloxy ethylene, 4-methylbenzyl and phenylethenyl.

In a third subgenus, the units are of formulae

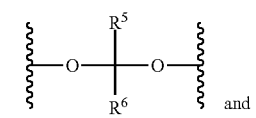
7.

and

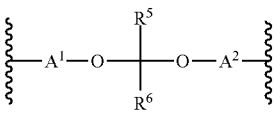
8.

Embodiments of polymers in this subgenus include those in which $R^5$ and $R^6$ are both methyl or both phenyl. In other embodiments, $R^5$ and $R^6$ together with the carbon to which they are attached form a cyclohexane ring. The common structural feature of the three families in this subgenus is

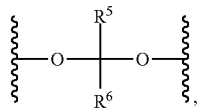

and the diol precursor 7 may be extended in a parallel fashion to that described above for formulae 1, 2 and 3. In some embodiments $A^1$ and $A^2$ are chosen from amino-terminal or oxy-terminal-$(C_1$-$C_4)$alkylene-, —$(C_2$-$C_4)$azaalkylene-, —$(C_2$-$C_4)$N-acetylazaalkylene-, 4-methylbenzyloxymethylene, 4-methylbenzyloxy ethylene, 4-methylbenzyl and phenylethenyl.

Examples include

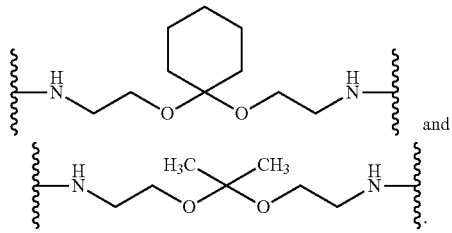

In a fourth subgenus, the units are of formula

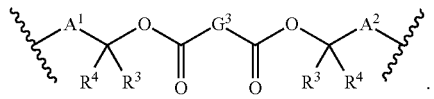

Embodiments of polymers in this subgenus include those in which $R^3$ and $R^4$ are both methyl. In some embodiments $G^3$ is selected from direct bond, —CH=CH—, p-phenylene and tetrafluoro-p-phenylene. An example ($G^3$=—CH=CH—; $R^3$=$R^4$=methyl; $A^1$=$A^2$=—CH$_2$CH$_2$O—) is

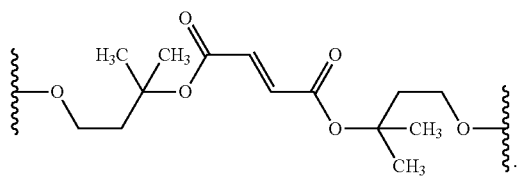

In a fifth subgenus, the units are of formula

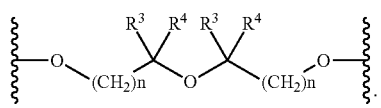

Embodiments of polymers in this subgenus include those in which $R^3$ and $R^4$ are both methyl and n is 2.

The polymer described above may be a polyester, in which the first component is of formula —CO-$G^5$-CO— wherein $G^5$ is selected from an alkane, a fluoroalkane, an arene, a fluoroarene, a diaryl ether and a diaryl. The polymer described above may also be a polyether in which the first component is of formula -$G^5$- wherein $G^5$ is selected from an alkane, a fluoroalkane, an arene, a fluoroarene, a diaryl ether and a diaryl. The polymer described above may also be a polyurethane in which the first component is of formula —C(=O)NH-$G^5$-NHC(=O)— wherein $G^5$ is selected from an alkane, a fluoroalkane, an arene, a fluoroarene, a diaryl ether and a diaryl.

The polymer described above may also be a polyester, polyether or polyurethane that comprises a third component. The third component may be of formula —CO-$G^6$-CO— or —O-$G^6$-O—, wherein $G^6$ contains a PAG function. Suitable PAG monomers for integration into the polymer along with those of the present invention are disclosed in PCT/US09/34707 and in a copending US provisional application titled PHOTOLYTIC ACID-GENERATING POLYMERS AND MONOMERS FOR THEIR CONSTRUCTION, filed of even date herewith. The disclosures of both are incorporated herein by reference.

The polymers of the invention may be constructed from monomers of the formula

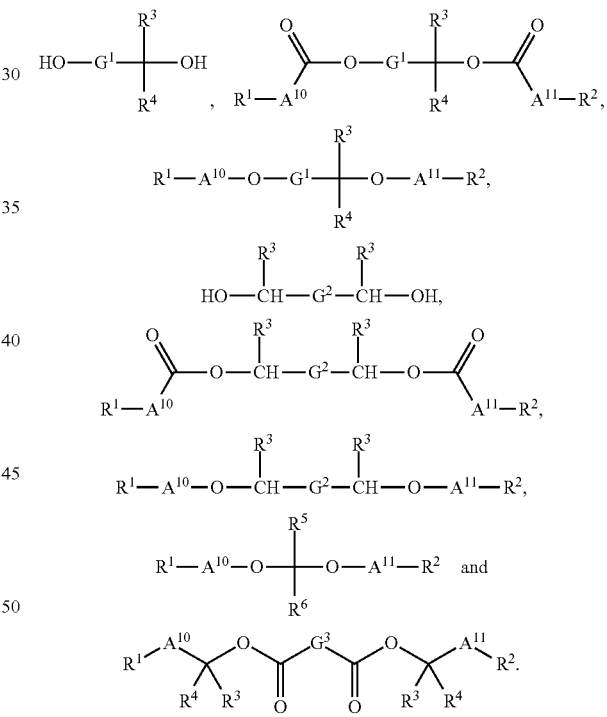

Although $R^1$ and $R^2$ may be chosen independently from —OH, —NH$_2$, —Cl, —Br, —SO$_2$Cl, —N=C=O and —COCl, $R^1$ and $R^2$ will usually be the same due to the practical consideration of the cost of syntheses. To construct a polyester, $R^1$ and $R^2$ may be either —OH or —COCl. To construct a polyether, $R^1$ and $R^2$ may be either —OH or halogen, preferably —Br or —Cl. To construct a polyurethane, $R^1$ and $R^2$ may be either —OH or —N=C=O. Examples of monomers useful in constructing polymers of the invention include those in which $R^1$ and $R^2$ are both —OH or —NH$_2$:

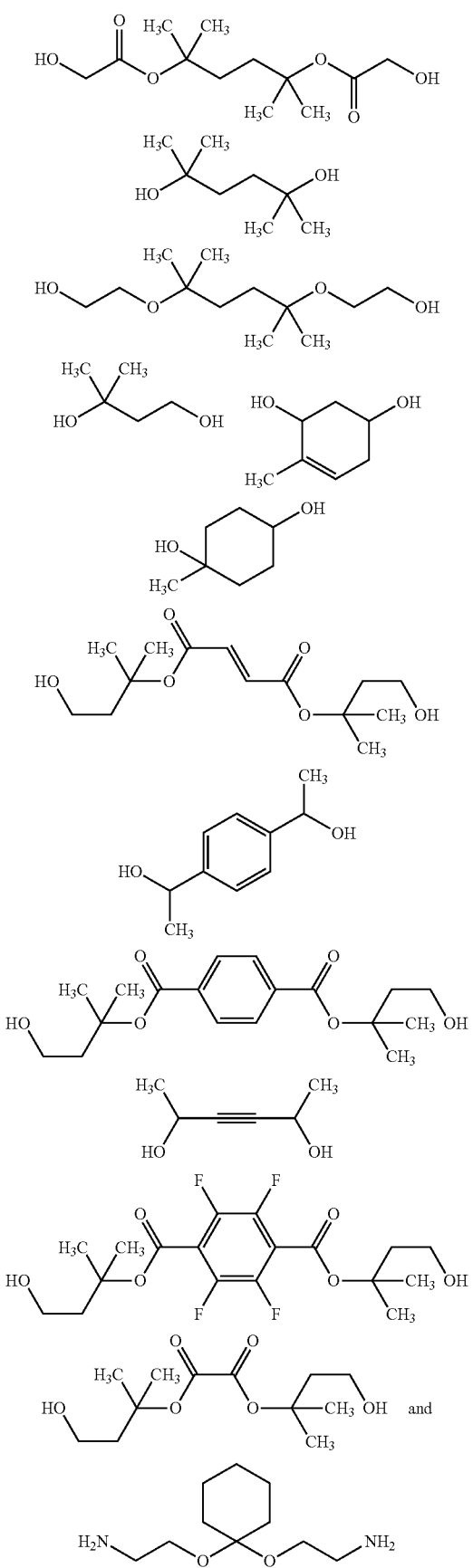
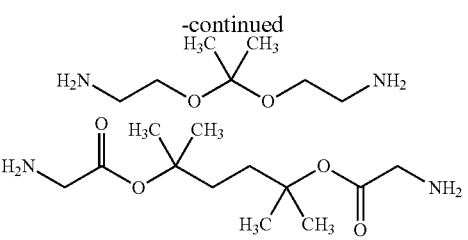
The diol monomers can be used to prepare polyesters and the diamine monomers can be used to prepare polyamides by reacting with such diacyl chlorides as
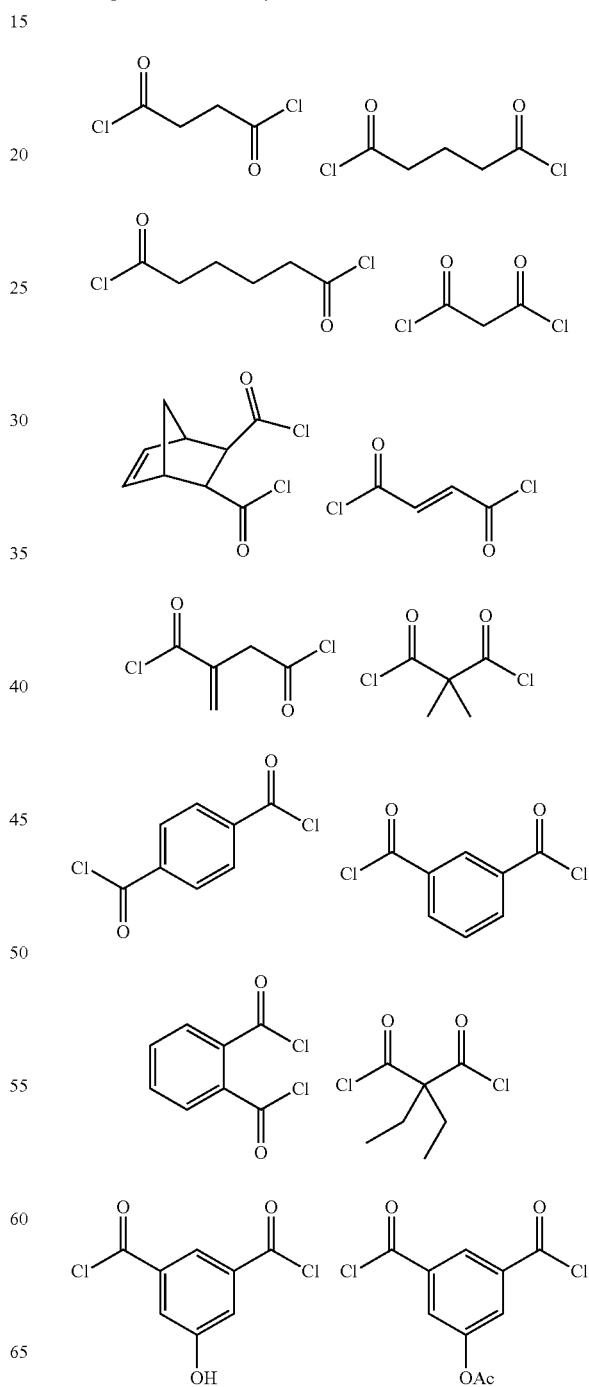

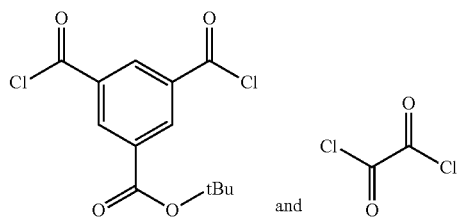

Throughout this specification the terms and substituents retain their definitions.

Alkyl is intended to include linear, branched, or cyclic hydrocarbon structures and combinations thereof. Lower alkyl refers to alkyl groups of from 1 to 6 carbon atoms. Examples of lower alkyl groups include methyl, ethyl, propyl, isopropyl, butyl, s- and t-butyl and the like. Preferred alkyl groups are those of $C_{20}$ or below. Cycloalkyl is a subset of alkyl and includes cyclic hydrocarbon groups of from 3 to 8 carbon atoms. Examples of cycloalkyl groups include c-propyl, c-butyl, c-pentyl, norbornyl and the like.

$C_1$ to $C_{20}$ Hydrocarbon includes alkyl, cycloalkyl, polycycloalkyl, alkenyl, alkynyl, aryl and combinations thereof. Examples include benzyl, phenethyl, cyclohexylmethyl, camphoryl and naphthylethyl. The term "carbocycle" is intended to include ring systems consisting entirely of carbon but of any oxidation state. Thus ($C_3$-$C_{10}$) carbocycle refers to such systems as cyclopropane, benzene and cyclohexene; ($C_8$-$C_{12}$) carbopolycycle refers to such systems as norbornane, decalin, indane and naphthalene.

Alkoxy or alkoxyl refers to groups of from 1 to 8 carbon atoms of a straight, branched, cyclic configuration and combinations thereof attached to the parent structure through an oxygen. Examples include methoxy, ethoxy, propoxy, isopropoxy, cyclopropyloxy, cyclohexyloxy and the like. Loweralkoxy refers to groups containing one to four carbons. Methoxy is preferred. For the purpose of this application, alkoxy and lower alkoxy include methylenedioxy and ethylenedioxy.

Oxaalkyl refers to alkyl residues in which one or more carbons (and their associated hydrogens) have been replaced by oxygen. Examples include methoxypropoxy, 3,6,9-trioxadecyl and the like. The term oxaalkyl is intended as it is understood in the art [see Naming and Indexing of Chemical Substances for Chemical Abstracts, published by the American Chemical Society, 196, but without the restriction of 127(a)], i.e. it refers to compounds in which the oxygen is bonded via a single bond to its adjacent atoms (forming ether bonds); it does not refer to doubly bonded oxygen, as would be found in carbonyl groups. Similarly, thiaalkyl and azaalkyl refer to alkyl residues in which one or more carbons has been replaced by sulfur or nitrogen, respectively. Examples include ethylaminoethyl and methylthiopropyl.

Unless otherwise specified, acyl refers to formyl and to groups of 1, 2, 3, 4, 5, 6, 7 and 8 carbon atoms of a straight, branched, cyclic configuration, saturated, unsaturated and aromatic and combinations thereof, attached to the parent structure through a carbonyl functionality. One or more carbons in the acyl residue may be replaced by nitrogen, oxygen or sulfur as long as the point of attachment to the parent remains at the carbonyl. Examples include acetyl, benzoyl, propionyl, isobutyryl, t-butoxycarbonyl, benzyloxycarbonyl and the like. Lower-acyl refers to groups containing one to four carbons. The double bonded oxygen, when referred to as a substituent itself is called "oxo".

Aryl and heteroaryl mean a 5- or 6-membered aromatic or heteroaromatic ring containing 0-3 heteroatoms selected from O, N, or S; a bicyclic 9- or 10-membered aromatic or heteroaromatic ring system containing 0-3 heteroatoms selected from O, N, or S; or a tricyclic 13- or 14-membered aromatic or heteroaromatic ring system containing 0-3 heteroatoms selected from O, N, or S.

The term "substituted" refers to the replacement of one or more hydrogen atoms in a specified group with a specified radical. For example, substituted alkyl, aryl, heterocyclyl, etc. refer to alkyl, aryl, or heterocyclyl wherein one or more H atoms in each residue are replaced with halogen, haloalkyl, alkyl, hydroxyl, loweralkoxy, carboxy, carboalkoxy (also referred to as alkoxycarbonyl), carboxamido (also referred to as alkylaminocarbonyl), cyano, carbonyl, nitro, amino, alkylamino, dialkylamino, mercapto, alkylthio, sulfoxide, sulfone, acylamino, amidino, aryl, benzyl, heteroaryl, phenoxy, benzyloxy, or heteroaryloxy.

The term "halogen" means fluorine, chlorine, bromine or iodine.

The term "component" means a repeating unit, covalently bonded in a polymer. By repeating is meant that the residue occurs at least two times in the polymer. The component can be in the polymer backbone, a side-chain or a cross-link. Preferably, the component is a repeating unit in the polymer backbone. The terms "repeating unit' and "structural unit" are terms of art [see M. P. Stevens, *Polymer Chemistry*, Third Edition, Oxford University Press (1999)] and may be used interchangeably with "component".

Terminology related to "protecting", "deprotecting" and "protected" functionalities occurs throughout this application. Such terminology is well understood by persons of skill in the art and is used in the context of processes which involve sequential treatment with a series of reagents. In that context, a protecting group refers to a group which is used to mask a functionality during a process step in which it would otherwise react, but in which reaction is undesirable. The protecting group prevents reaction at that step, but may be subsequently removed to expose the original functionality. The removal or "deprotection" occurs after the completion of the reaction or reactions in which the functionality would interfere. Thus, when a sequence of reagents is specified, as it is in the processes of the invention, the person of ordinary skill can readily envision those groups that would be suitable as "protecting groups".

In the case of the present invention, the functionalities that must be protected include carboxylic acids and alcohols and occasionally amines. Suitable groups for that purpose are discussed in standard textbooks in the field of chemistry, such as *Protective Groups in Organic Synthesis* by T. W. Greene and P. G. M. Wuts [John Wiley & Sons, New York, 1999], which is incorporated herein by reference.

Polymers can be synthesized using numerous combinations of commercially available diacid chlorides and diols.

Step-growth polymers are well known and are of great commercial importance. Nylon and PET are high volume examples. Novolak polymers used in I-line resists are also step-growth polymers. Since I-line, however, nearly all of the polymers used in photoresists have been free-radical chain-growth polymers such as those used in the preparation of DUV, 193 nm and EUV photoresists. One of the advantageous characteristics of step-growth polymerization is that the high molecular weight polymers are not created until the end of the polymerization reaction. Since many of the features of polymers for photolithography depend upon the reduction of molecular weight upon photolysis, it is advantageous to prepare polymers with molecular weights of 6,000 g/mol or greater.

Many commercially successful step-growth polyesters are prepared directly from dicarboxylic acids and diols at high temperatures. In the case of some polymers of the invention, however, it is preferred to conduct polymerizations at temperatures less than about 40° C. to minimize thermal decomposition. Reacting diacid chlorides with dials is typically considered "overkill" for high volume polyester production, however, for synthesis with tertiary alcohols, moderate temperatures are desirable. To accomplish this, one may convert the tertiary diols to tertiary dialkoxides by reaction with n-BuLi prior to reaction with the diacid chlorides (Scheme 1). These reactions are quite exothermic so that they need to be conducted at controlled temperature to give high yields. An additional feature of this approach is that the by-product of this reaction (LiCl) is easier to remove than pyridine or triethylamine.

(quencher base). Similarly, trifunctional monomers such as 30, 31 and 32, having a protected phenol or a tertiary ester capable of deprotection (shown below) could be used. Compounds 48-50 have tertiary amines that will not react with acid chlorides, so will add quencher base to the polymer. With both acids and bases covalently attached to polymers, image blur due to diffusion will be at minimum.

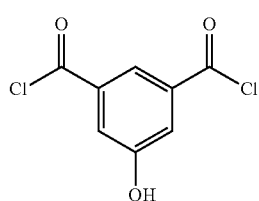

30

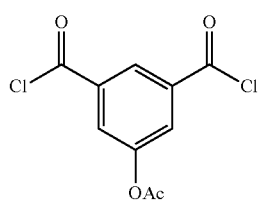

31

Scheme 1

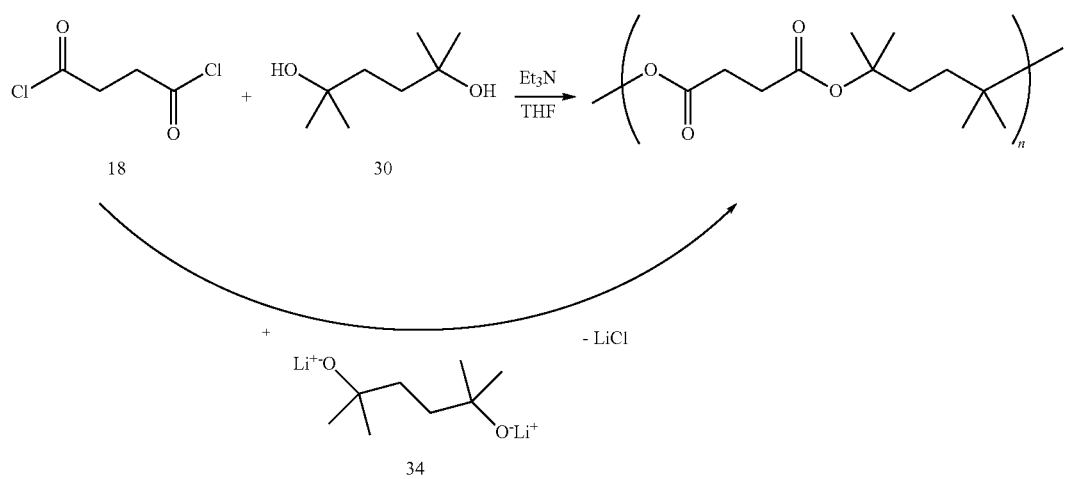

One approach for linking low molecular weight oligomers together at the end of the polymerization is to add unhindered diols, diphenols or diamines such as molecules 35-44 in Table 4. Although these linkages are inactive toward acidolysis, they provide an additional method for building molecular weight since they are more reactive than the tertiary diols toward acid chlorides. Unhindered trifunctional monomers can also be added at the end of the reaction to build molecular weight. In particular, molecules 45-47 can be used to link oligomers together. Trifunctional monomers are also interesting because they can react twice and leave desirable unreacted functional groups such as phenols (adhesion) or amines -continued

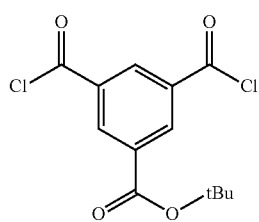

32

TABLE 4

Difunctional Molecules for Mw Build:

35: hydroquinone (1,4-dihydroxybenzene)

36: resorcinol (1,3-dihydroxybenzene)

37: bisphenol A

38: 1,4-butanediol

39: 1,4-cyclohexanedimethanol

40: ethanolamine ($H_2N$-CH$_2$CH$_2$-OH)

41: 1,4-diaminobutane

42: 1,4-diaminocyclohexane

43: 1,2-diaminocyclohexane

44: 1,2-diaminopropane

Trifunctional Molecules for Mw Build:

45: 1,1,1-tris(4-hydroxyphenyl)ethane

46: phloroglucinol (1,3,5-trihydroxybenzene)

47: N-(2-aminoethyl)-1,3-propanediamine

TABLE 4-continued

Two reactive sites, that will leave base functionality in polymer chain.

48: $H_2N$-(CH$_2$)$_3$-N(CH$_3$)-(CH$_2$)$_3$-$NH_2$

49: 2,6-diaminopyridine

50: 1-(2-aminoethyl)piperazine

Trace amounts of water present during the polymerization could limit molecular weight by converting acid chlorides to the much less reactive carboxylic acids. To counteract this problem, one can use activating agents 51-53 shown in Table 5. These compounds could be used to couple carboxylic acids and alcohols together to form esters.

TABLE 5

Activating Agents

51 1,1-Carbonyldiimidazole

52 DPCP (diphenyl chlorophosphate)

53 DCC (dicyclohexylcarbodiimide)

Example 1

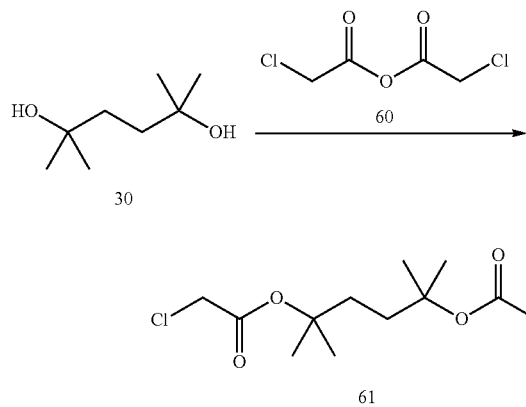

2,5-Dimethylhexane-2,5-diyl bis(2-chloroacetate) (61)

A solution of 2,5-dimethylhexane-2,5-diol (0.146 g, 1 mmol) in 20 mL cyclohexane was brought to reflux under nitrogen. Chloroacetic anhydride (60) (1.531 g, 9 mmol) was added and the solution was allowed to reflux for 24 hours. The solution was then washed with 5% aqueous sodium carbonate (2×200 mL) followed by brine (1×200 mL), dried with sodium sulfate, and evaporated to dryness to produce a clear yellow liquid (0.200 g) $^1$H NMR (CDCl$_3$): δ 1.44 (12H, s), 1.83 (4H, s), 3.96 (4H, s).

Example 2

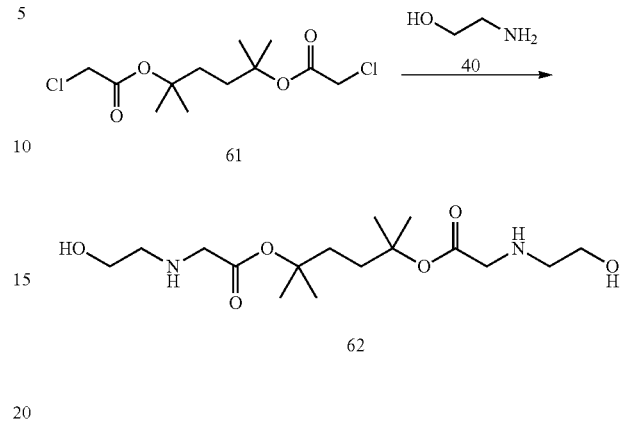

2,5-Dimethylhexane-2,5-diyl bis(2-(2-hydroxyethylamino)acetate) (62)

To a solution of compound (61) (0.898 g, 3 mmol) in 5 mL of methylene chloride at 0° C., ethanolamine (40) (2.504 g, 41 mmol) was added drop wise over the course of one hour. The solution was then allowed to warm to 20° C. and stirred for 18 hours. On completion, the reaction was diluted with CH$_2$Cl$_2$ (15 mL) and washed with brine (1×20 mL) and dried. The solvent was evaporated to get clear yellow oil. (0.380 g) $^1$H NMR (400 MHz, CDCl$_3$): δ 1.35 (s, 12H), 1.79 (s, 4H), 2.68-2.71 (t, J=5.1, 4H), 3.08 (b, 4H), 3.26 (s, 4H), 3.58-3.60 (t, J=5.1, 4H).

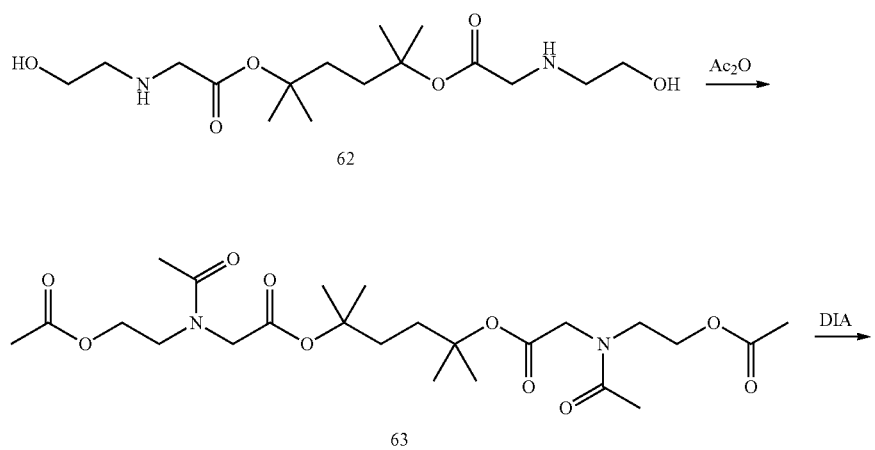

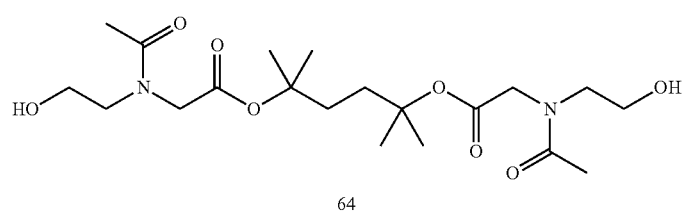

2,5-Dimethylhexane-2,5-diyl bis(2-(N-(2-hydroxyethyl)acetamido)acetate) (64)

The cleavable diol is made in the following manner. Compound (62) is reacted with excess acetic anhydride in methylene chloride, pyridine and 4-dimethylaminopyridine at room temperature followed by an aqueous workup to yield 2,5-dimethylhexane-2,5-diylbis(2-(N-(2-hydroxyethyl)acetamido)acetate) (63). The primary acetate is then removed by reacting (63) with diisopropylamine in methylene chloride. The solution is then reduced at high vacuum to yield 2,5-dimethylhexane-2,5-diylbis(2-(N-(2-hydroxyethyl)acetamido)acetate) (64).

Example 3

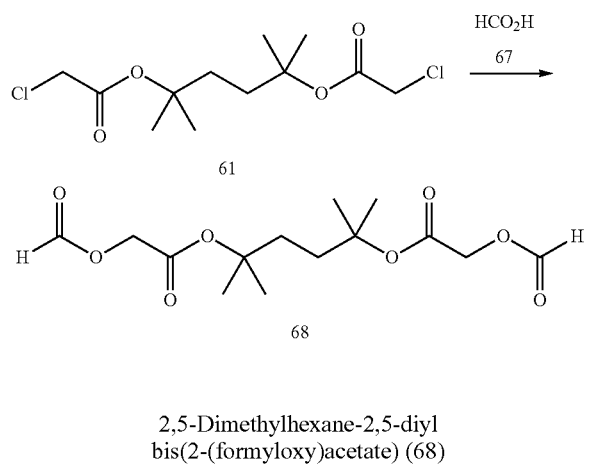

2,5-Dimethylhexane-2,5-diyl bis(2-(formyloxy)acetate) (68)

Formic acid (67) (0.921 g, 20 mmol) and triethylamine (2.226 g, 22 mmol) were combined and stirred for 30 minutes. Compound (61) (0.299 g, 1 mmol) was then added and stirred for three days. The solution was dissolved in 10 mL of ethyl acetate and the precipitate was filtered and washed with 10 mL diethylether. The combined filtrate was then washed with brine and dried with sodium sulfate. The solvent was evaporated to get dark brown viscous oil. $^1$H NMR (400 MHz, CDCl$_3$): δ 1.44 (s, 12H), 1.80 (s, 4H), 4.57 (s, 4H), 8.11 (s, 2H).

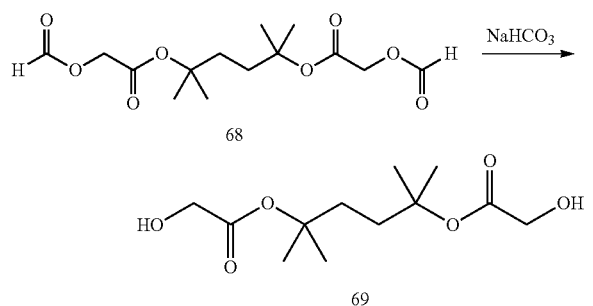

2,5-Dimethylhexane-2,5-diyl bis(2-hydroxyacetate) (69)

[see Kodadeck et. al. J. Am. Chem. Soc. (2004), 126(13), 4088-4089.] The crude product (68) was combined with aqueous sodium bicarbonate solution (20 mL, 0.75 N) and stirred for 3 days. The compound was then removed from the aqueous phase using continuous distillation in ether overnight. The organic phase was then evaporated to get a white solid. (0.032 g) $^1$H NMR (400 MHz, CDCl$_3$): δ 1.36 (s, 12H), 1.84 (s, 4H), 3.41 (b, 2H), 4.00 (s, 4H).

Example 4

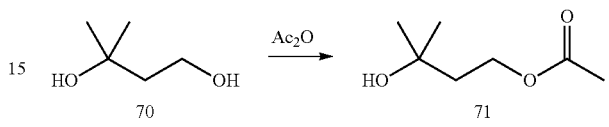

3-Hydroxy-3-methylbutyl acetate (71)

A solution of 16 mL 3-methylbutane-1,3-diol in 10 mL methylene chloride with a catalytic amount of 4-dimethylpyridine was cooled to 0° C. Acetic anhydride (4.084 g, 40 mmol) was then added drop wise and the solution was stirred for 5 hours. An additional 10 mL of methylene chloride was added and the solution was washed with 10% aqueous ammonium chloride (2×20 mL), 5% sodium carbonate (2×20 mL) and brine (1×20 mL), dried over sodium sulfate and evaporated to dryness to yield a clear, yellow liquid. (2.402 g) $^1$H NMR (400 MHz, CDCl$_3$): δ 1.24 (s, 6H), 1.56 (b, 1H), 1.80-1.83 (t, J=6.8, 2H), 2.02 (s, 3H), 4.22 (t, J=6.9, 2H).

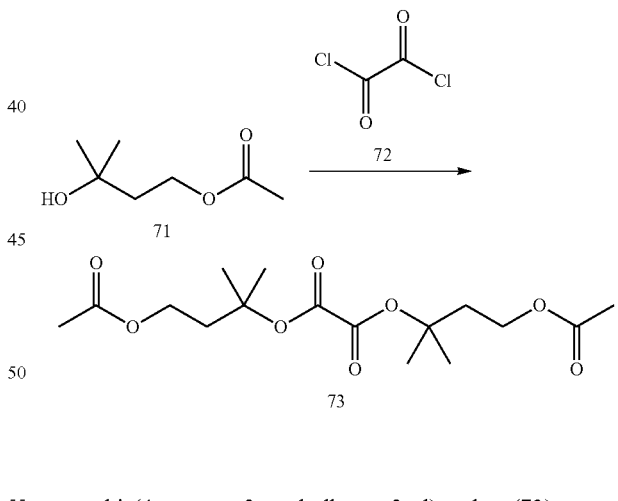

bis(4-acetoxy-2-methylbutan-2-yl)oxalate (73)

To a solution of compound (71) (0.322 g, 2.2 mmol) in 10 mL pyridine, oxalyl chloride (0.127 g, 1 mmol) was added slowly and the solution was stirred overnight. 20 mL of ethyl acetate was then added and was washed with 10% ammonium chloride (3×20 mL) followed by brine (1×20 mL). The organic layer was then dried over sodium sulfate, evaporated to dryness and the crude product was collected as an oily, white solid. (0.130 g) $^1$H NMR (400 MHz, CDCl$_3$): δ 1.57 (s, 12H), 2.04 (s, 6H), 2.19 (t, J=6.8, 4H), 4.20-4.24 (t, J=6.9, 4H).

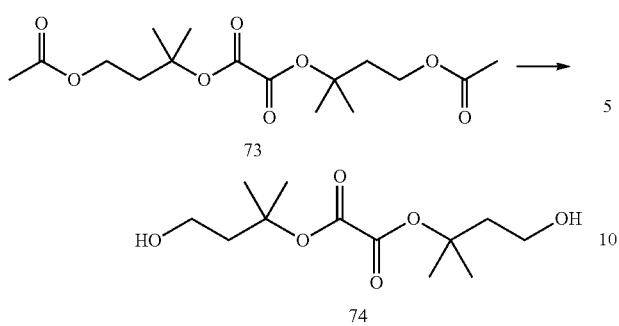

Bis(4-hydroxy-2-methylbutan-2-yl)oxalate (74)

The cleavable diol is made in the following manner. To a solution of compound (73) in methylene chloride, diisopropylamine is added and the solution is stirred until reaction is complete. A standard aqueous workup is done and the diol should remain in the organic phase. Evaporate the solvent and collect bis(4-hydroxy-2-methylbutan-2-yl)oxalate (74).

Example 5

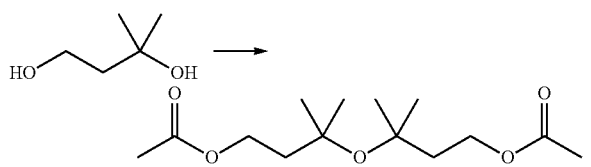

3,3'-Oxybis(3-methylbutan-1-yl)diacetate

To an oven-dried flask containing a catalytic amount of zirconium(IV) oxychloride octahydrate, under nitrogen was added 3-methylbutane-1,3-diol (2.500 g, 24 mmol) and methylene chloride (50 mL). While stirring, acetyl chloride (5.652 g, 72 mmol) was added dropwise over 20 minutes using a syringe pump. Let stir overnight, then worked up by washing with 5% sodium carbonate (2×50 mL) then brine (1×50 mL), dried over sodium sulfate, filtered and dried under reduced pressure. The product was a viscous clear yellow oil (1.763 g yield). $^1$H NMR (400 MHz, CDCl$_3$): δ 1.59 (s, 12H), 2.02 (s, 6H), 2.08 (t, J=6.9, 4H), 4.28 (t, J=6.9, 4H).

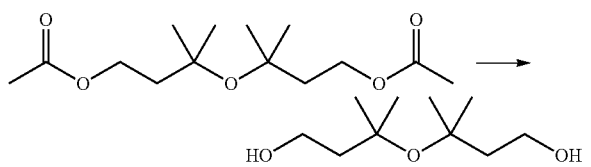

3,3'-Oxybis(3-methylbutan-1-ol)

To a flask containing 3,3'-oxybis(3-methylbutan-1-yl) diacetate (0.274 g, 1 mmol), was added 10 mL of 2.0N methanolic ammonia and the reaction was stirred overnight at room temperature. Solvent was then removed under reduced pressure. Compound was then dissolved in 20 mL diethyl ether and precipitate was filtered out. Filtrate was then reduced under vacuum to yield a colorless liquid. (0.187 g yield) $^1$H NMR (400 MHz, CDCl$_3$): δ 1.61 (s, 12H), 2.04 (t, J=6.6, 4H), 3.88 (t, J=6.6, 4H).

Example 6

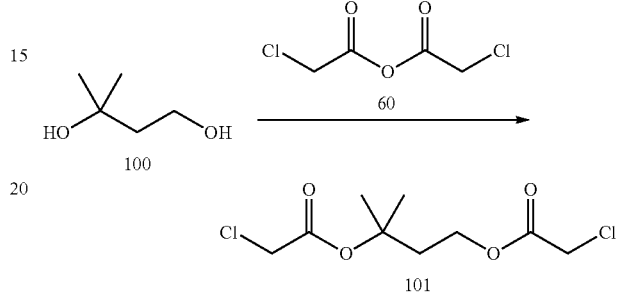

3-Methylbutane-1,3-diyl bis(2-chloroacetate) (101)

A solution of 3-methylbutane-1,3-diol (100) (0.208 g, 2 mmol) in 40 mL cyclohexane was brought to reflux under nitrogen. Chloroacetic anhydride (60) (3.419 g, 20 mmol) was added and the solution was allowed to reflux for 24 hours. The solution was then washed with 5% aqueous sodium carbonate (2×20 mL) followed by brine (1×20 mL), dried with sodium sulfate, and evaporated to dryness to produce a clear yellow liquid (0.454 g) $^1$H NMR (CDCl$_3$): δ 1.52 (6 H, s), 2.18 (2H, t), 3.96 (2H, s), 4.03 (2H, s), 4.29 (2H, t).

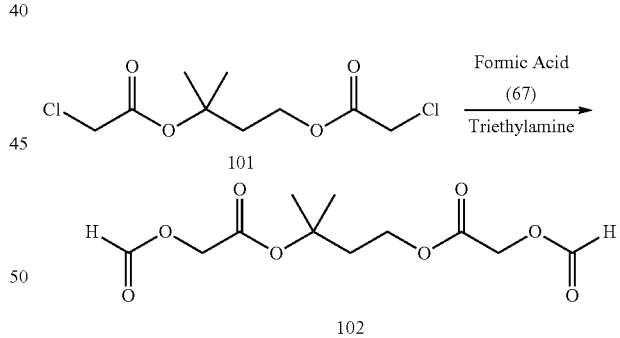

3-Methylbutane-1,3-diyl bis(2-(formyloxy)acetate) (102)

Formic acid (67) (0.921 g, 20 mmol) and triethylamine (2.226 g, 22 mmol) were combined and stirred for 30 minutes. Compound (101) (0.454 g, 1.8 mmol) was then added and stirred for three days. The solution was dissolved in 10 mL of ethyl acetate and the precipitate was filtered and washed with 10 mL, diethylether. The combined filtrate was then washed with brine and dried with sodium sulfate. The solvent was evaporated to get dark brown viscous oil.

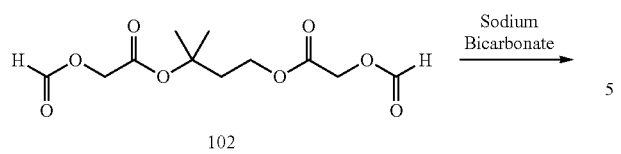

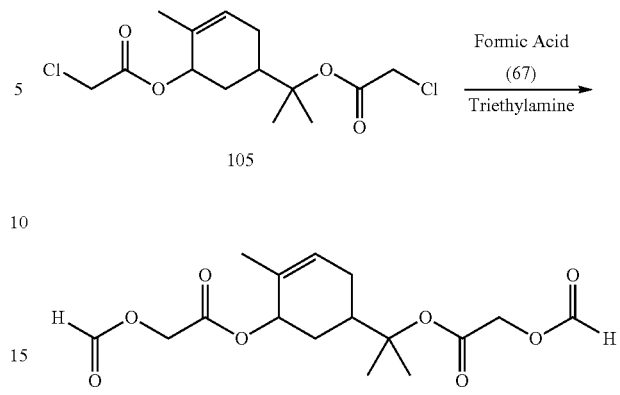

3-Methylbutane-1,3-diyl bis(2-hydroxyacetate) (103)

The crude product (102) was combined with aqueous sodium bicarbonate solution (20 mL, 0.75 N) and stirred for 3 days. The compound was then extracted using ethyl acetate in three 20 mL portions. The organic phase was then evaporated and separated in a column to get a clear oil. $^1$H NMR (400 MHz, CDCl$_3$): δ 1.42 (s, 6H), 2.19 (t, 2H), 2.58 (s, 2H), 4.00 (s, 2H), 4.16 (s, 2H), 4.28 (t, 2H).

2-(5-(2-(Formyloxy)acetoxy)-4-methylcyclohex-3-enyl)propan-2-yl 2-(formyloxy)acetate (106)

Formic acid (67) (0.921 g, 20 mmol) and triethylamine (2.226 g, 22 mmol) were combined and stirred for 30 minutes. Compound (61) (0.599 g, 1.7 mmol) was then added and stirred for three days. The solution was dissolved in 10 mL of ethyl acetate and the precipitate was filtered and washed with 10 mL diethylether. The combined filtrate was then washed with brine and dried with sodium sulfate. The solvent was evaporated to get dark brown viscous oil which was used directly for the next step.

Example 7

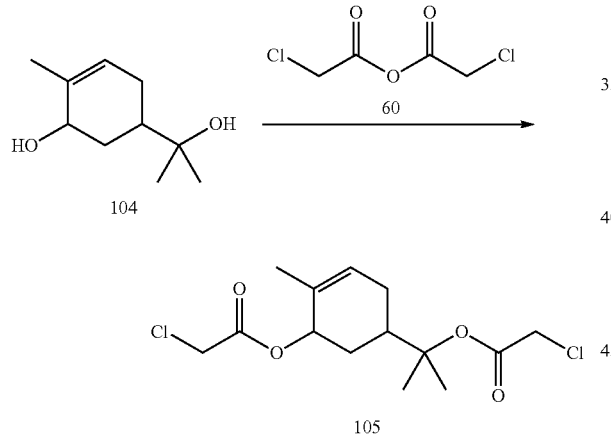

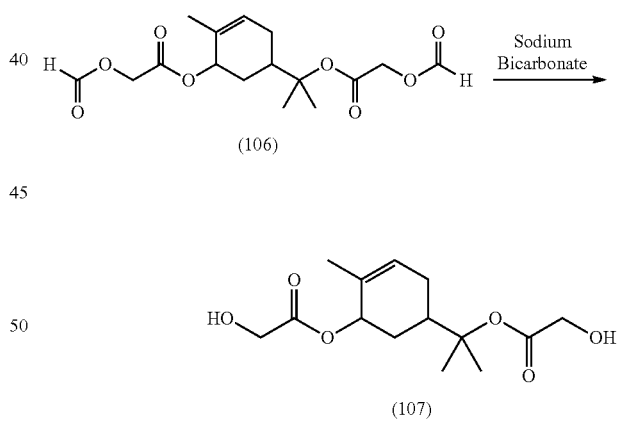

2-(5-(2-Chloroacetoxy)-4-methylcyclohex-3-enyl)propan-2-yl 2-chloroacetate (105)

A solution of 5-(2-hydroxypropan-2-yl)-2-methylcyclohex-2-enol (104) (0.341 g, 2 mmol) in 40 mL cyclohexene was brought to reflux under nitrogen. Chloroacetic anhydride (60) (3.419 g, 20 mmol) was added and the solution was allowed to reflux for 24 hours. The solution was then washed with 5% aqueous sodium carbonate (2×20 mL) followed by brine (1×20 mL), dried with sodium sulfate, and evaporated to dryness to produce a clear yellow liquid (0.559 g)$^1$H NMR (CDCl$_3$): δ 1.43 (s, 3H), 1.48 (s, 3H) 1.68 (s, 3H), 1.84 (t, 2H), 2.05 (dd, 1H), 2.26 (t, 2H), 3.93 (s, 2H), 4.04 (s, 2H), 5.28 (s, 1H), 5.73 (s, 1H).

2-(5-(2-Hydroxyacetoxy)-4-methylcyclohex-3-enyl)propan-2-yl 2-hydroxyacetate (107)

The crude product (106) was combined with aqueous sodium bicarbonate solution (20 mL, 0.75 N) and stirred for 3 days. The compound was then extracted using ethyl acetate in three 20 mL portions. The organic phase was then evaporated and separated in a column to get a clear oil.) $^1$H NMR (CDCl$_3$): δ 1.19 (s, 3H), 1.43 (s, 3H), 1.61 (s, 3H), 1.75 (t, 2H), 2.00 (m, 1H), 2.36 (t, 2H), 2.63 (s, 2H), 3.98 (s, 2H), 4.16 (s, 2H), 5.27 (s, 1H), 5.68 (s, 1H).

Example 8

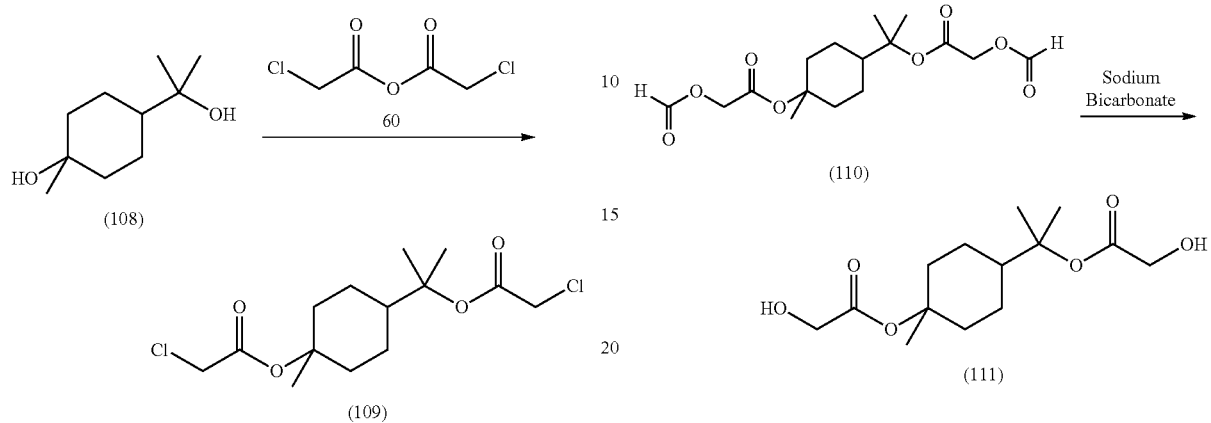

2-(4-(2-Chloroacetoxy)-4-methylcyclohexyl)propan-2-yl 2-chloroacetate (109)

A solution of 4-(2-hydroxypropan-2-yl)-1-methylcyclohexanol (108) (0.381 g, 2 mmol) in 40 mL cyclohexane was brought to reflux under nitrogen. Chloroacetic anhydride (60) (1.531 g, 9 mmol) was added and the solution was allowed to reflux for 24 hours. The solution was then washed with 5% aqueous sodium carbonate (2×20 mL) followed by brine (1×20 mL), dried with sodium sulfate, and evaporated to dryness to produce a clear yellow liquid (0.623 g) $^1$H NMR (CDCl$_3$): δ 1.32 (m, 4H), 1.44 (s, 6H), 1.49 (s, 3H), 1.56 (m, 2H), 1.90 (m, 1H), 2.38 (d, 2H), 3.95 (s, 2H), 3.97 (s, 2H).

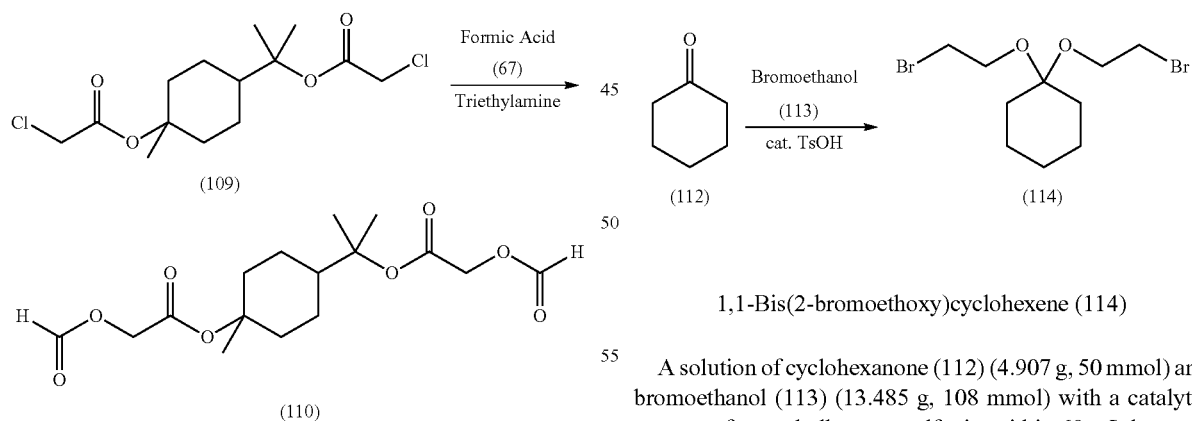

2-(4-(2-(Formyloxy)acetoxy)-4-methylcyclohexyl)propan-2-yl 2-(formyloxy)acetate (110)

Formic acid (67) (0.921 g, 20 mmol) and triethylamine (2.226 g, 22 mmol) were combined and stirred for 30 minutes. Compound (109) (0.623 g, 1.9 mmol) was then added and stirred for three days. The solution was dissolved in 10 mL of ethyl acetate and the precipitate was filtered and washed with 10 mL diethylether. The combined filtrate was then washed with brine and dried with sodium sulfate. The solvent was evaporated to get dark brown viscous oil.

2-(4-(2-Hydroxyacetoxy)-4-methylcyclohexyl)propan-2-yl 2-hydroxyacetate (111)

The crude product (110) was combined with aqueous sodium bicarbonate solution (20 mL, 0.75 N) and stirred for 3 days. The compound was then extracted using ethyl acetate in three 20 mL portions. The organic phase was then evaporated and separated in a column to get a clear oil. $^1$H NMR (400 MHz, CDCl$_3$): δ 1.21 (m, 8H), 1.40 (s, 6H), 1.53 (s, 3H), 2.00 (m, 1H), 2.19 (s, 1H), 2.21 (s, 1H), 3.98 (s, 2H), 4.01 (s, 2H).

Example 9

1,1-Bis(2-bromoethoxy)cyclohexene (114)

A solution of cyclohexanone (112) (4.907 g, 50 mmol) and bromoethanol (113) (13.485 g, 108 mmol) with a catalytic amount of p-methylbenzenesulfonic acid in 60 mL benzene was brought to reflux under nitrogen in a round bottom flask fitted with a dean-stark adapter. The reaction was allowed to reflux overnight and then allowed to cool. The solution was then washed with 5% aqueous sodium carbonate (1×20 mL) followed by brine (2×20 mL), dried with sodium sulfate, evaporated to dryness and then separated on a column to produce a clear yellow liquid. $^1$H NMR (CDCl$_3$): δ 1.40 (m, 1H), 1.50 (s, 2H), 1.63 (s, 2H), 3.45 (t, 2H), 3.77 (t, 2H).

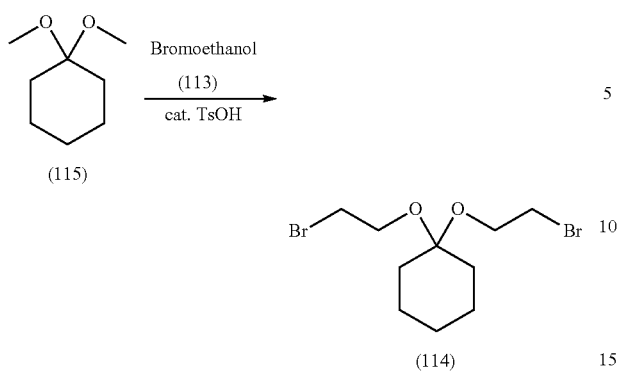

1,1-Bis(2-bromoethoxy)cyclohexene—alternate method (114)

A solution of 1,1-dimethoxycyclohexane (115) (0.144 g, 1 mmol) and bromoethanol (113) (0.750 g, 6 mmol) with a catalytic amount of p-methylbenzenesulfonic acid in 60 mL benzene was brought to reflux under nitrogen. The reaction was allowed to reflux overnight and then allowed to cool. The solution was then washed with 5% aqueous sodium carbonate (1×20 mL) followed by brine (2×20 mL), dried with sodium sulfate, and evaporated to produce a clear yellow liquid. $^1$H NMR (CDCl$_3$): δ 1.40 (m, 1H), 1.50 (s, 2H), 1.63 (s, 2H), 3.45 (t, 2H), 3.77 (t, 2H).

Example 10

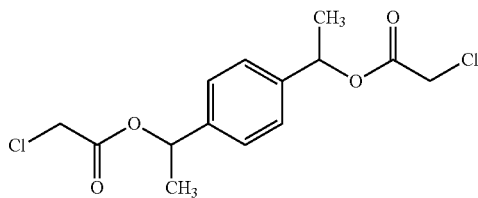 [SMILES: CC(OC(=O)CCl)c1ccc(C(C)OC(=O)CCl)cc1]

Di(chloroacetate)

To a solution containing 1 molar equivalent starting diol in 20 mL per equivalent cyclohexane, 8 to 10 molar equivalent of chloroacetic anhydride is added and stirred. The solution is brought to reflux and allowed to react overnight. The solution is then quenched with aqueous sodium carbonate, washed with brine and evaporated dry to yield the pure di(chloroacetate) compound.

Method 2. To a solution containing 1 molar equivalent starting diol in 20 mL per equivalent cyclohexane, 8 to 10 molar equivalent of sodium chloroacetate and 8 to 10 molar equivalent chloroacetyl chloride are added and stirred. The solution is brought to reflux and allowed to react overnight. The solution is then quenched with aqueous sodium carbonate, washed with brine and evaporated dry to yield the pure di(chloroacetate) compound.

Di(Formylacetate)

10 mL per molar equivalent of formic acid is carefully added to 11 mL per equivalent of triethylamine at 0° C. and stirred for 30 minutes. One molar equivalent of di(chloroacetate) cleavable diol is then added under nitrogen and the solution is stirred for three days. The solution is run through a silica plug, and the di(formylacetate) is retrieved.

Di(Glycolate)

To a 50 mL per molar equivalent solution of 5% aqueous sodium bicarbonate, 1 molar equivalent of di(formylacetate) in tetrahydrofuran is added and stirred for three days. The di(glycolate) is then extracted with three ethyl acetate washes and purified by column chromatography if needed.

Example 11

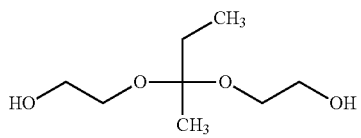

Bromo-Ketal Monomer

To a solution of 5 mL per molar equivalent of toluene, a catalytic amount of tosic acid, 1 molar equivalent of starting methyl ethyl ketone and 8 to 10 molar equivalents of bromoethanol are added. The solution is stirred and heated to reflux using a dean-stark apparatus. The solution is then quenched with aqueous sodium carbonate, brine and then separated on column to produce the bromo-ketal.

Method 2: (a) To a solution of 5 mL per molar equivalent of methanol, 1 molar equivalent of starting methyl ethyl ketone, 1 molar equivalent of trimethyl orthoacetate and a catalytic amount of tosic acid are combined and refluxed overnight. The solution is then quenched with aqueous sodium carbonate, brine and then dried. The dimethoxy-ketal product is then used in the next step.

(b) To a solution of 5 mL per molar equivalent of toluene, a catalytic amount of tosic acid, 1 molar equivalent of dimethoxy-ketal and 8 to 10 molar equivalents of bromoethanol are added. The solution is stirred and heated to reflux using a dean-stark apparatus. The solution is then quenched with aqueous sodium carbonate, brine and then dried to produce the bromo-ketal.

Ketal Diol

To a solution of 5 mL per molar equivalent of tetrahydrofuran and 1 mL per molar equivalent of dimethylformamide, 1 molar equivalent of bromo-ketal monomer, 3 molar equivalent of triethylamine and catalytic potassium iodide are added and stirred. 4 to 6 molar equivalent of p-hydroxy benzyl alcohol is added and stirred overnight. The solution is filtered through a silica plug and a standard aqueous work up is done to produce the ketal monomer.

The foregoing monomers can be converted to polymers of the invention as follows:

Example 12

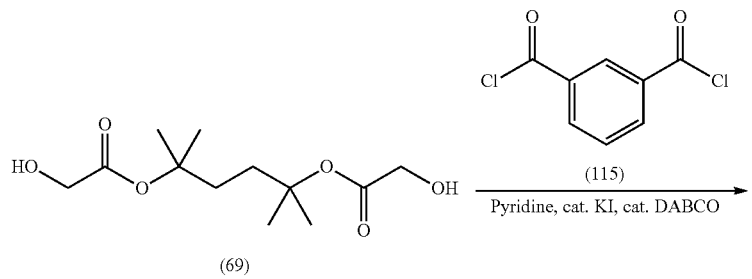

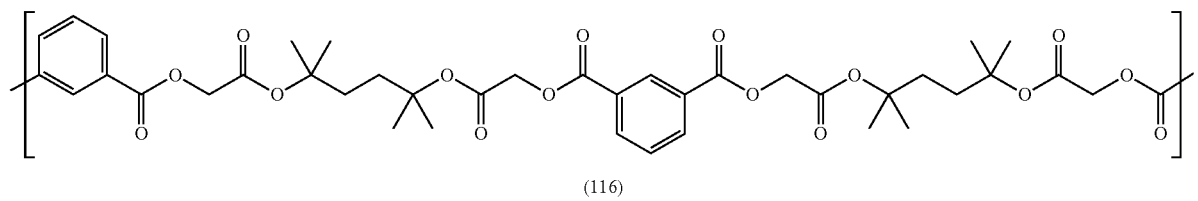

2,5-Dimethylhexane-2,5-diyl bis(2-hydroxyacetate)/isophthaloyl chloride copolymer (116)

A solution of 2,5-dimethylhexane-2,5-diyl bis(2-hydroxyacetate) (69) (0.997 g, 3.8 mmol), isophthaloyl chloride (115) (0.812 g, 4.0 mmol), a catalytic amount of 1,4-diazabicyclo[2.2.2]octane, and a catalytic amount of potassium iodide in 20 mL of pyridine was brought to 50° C. while stirring under nitrogen. After 24 hours, butanediol (0.072 g, 0.8 mmol) diluted in 10 mL of pyridine was added to the reaction mixture using a syringe pump over 8 hours. The solution was then quenched in 200 mL of cold 1N hydrochloric acid. The polymer precipitate is collected by filtration, redissolved in tetrahydrofuran, and precipitated in 100 mL of cold 1N hydrochloric acid. The polymer is then collected by filtration and dried under high vacuum. The polymer was found to have a molecular weight of ~14,000 g/mol by GPC.

Example 13

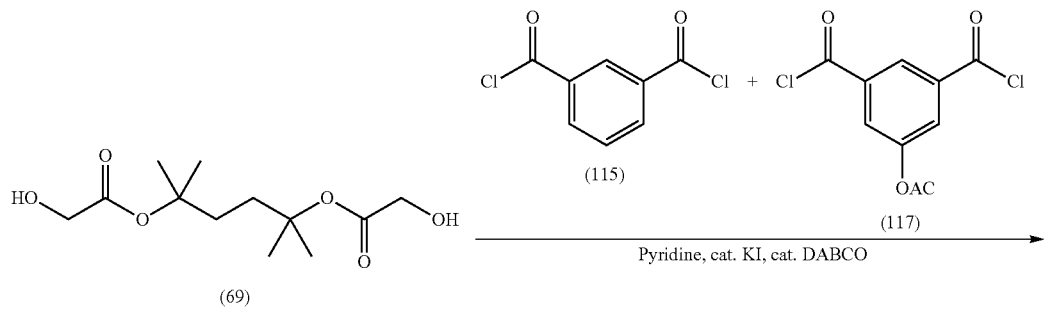

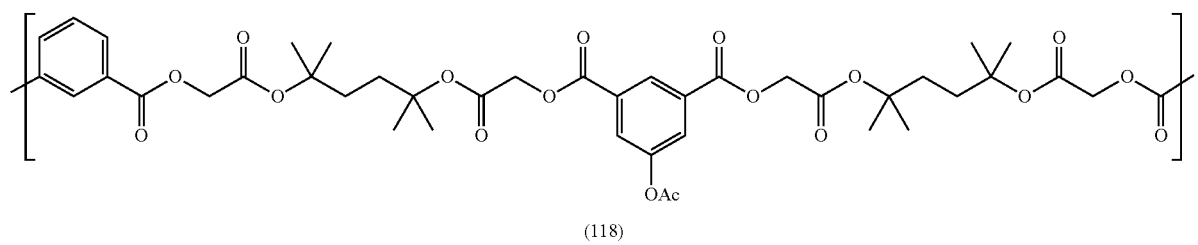

2,5-Dimethylhexane-2,5-diyl bis(2-hydroxyacetate)/isophthaloyl chloride/5-acetoxy isophthaloyl chloride terpolymer (118)

A solution of 2,5-dimethylhexane-2,5-diyl bis(2-hydroxyacetate) (69) (0.997 g, 3.8 mmol), isophthaloyl chloride (115) (0.406 g, 2.0 mmol), 5-acetoxy isophthaloyl chloride (117) (0.522 g, 2.0 mmol), a catalytic amount of 1,4-diazabicyclo[2.2.2]octane, and a catalytic amount of potassium iodide in 20 mL of pyridine was brought to 50° C. while stirring under nitrogen. After 24 hours, butanediol (0.072 g, 0.8 mmol) diluted in 10 mL of pyridine was added to the reaction mixture using a syringe pump over 8 hours. The solution was then quenched in 200 mL of cold 1N hydrochloric acid. The polymer precipitate is collected by filtration, redissolved in tetrahydrofuran, and precipitated in 100 mL of cold 1N hydrochloric acid. The polymer is then collected by filtration and dried under high vacuum. The polymer was found to have a molecular weight of ~14,000 g/mol by GPC.

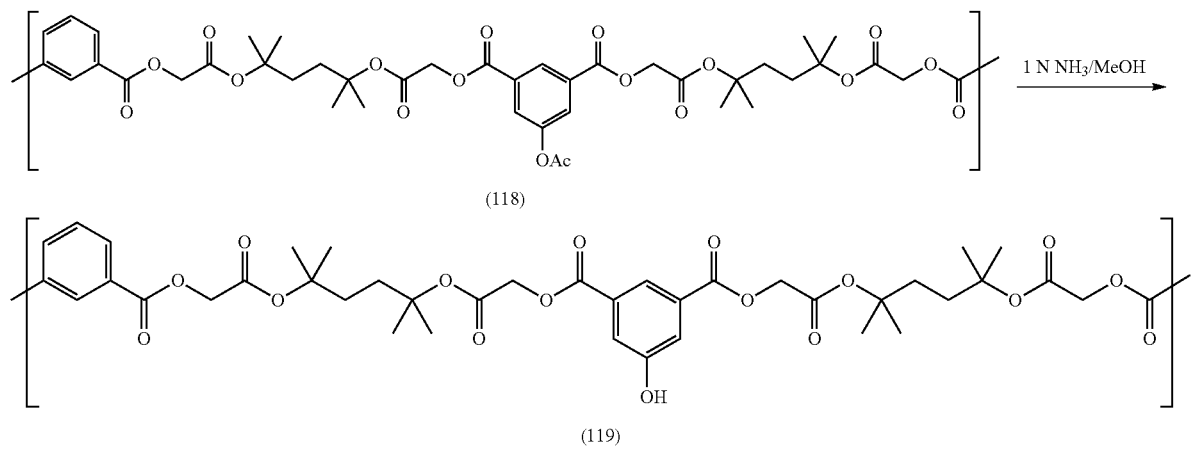

2,5-Dimethylhexane-2,5-diyl bis(2-hydroxyacetate)/isophthaloyl chloride/5-hydroxyisophthaloyl dichloride terpolymer (119)

To a solution of methanolic ammonia (20 mL, 1 N), polymer (118) dissolved in 5 mL tetrahydrofuran was added and the solution was stirred for two hours. The polymer was then precipitated in 100 mL of cold 1 N hydrochloric acid and collected by filtration. The polymer was then dried under high vacuum and was found to have a molecular weight of ~7,000 g/mol by GPC.

Example 14

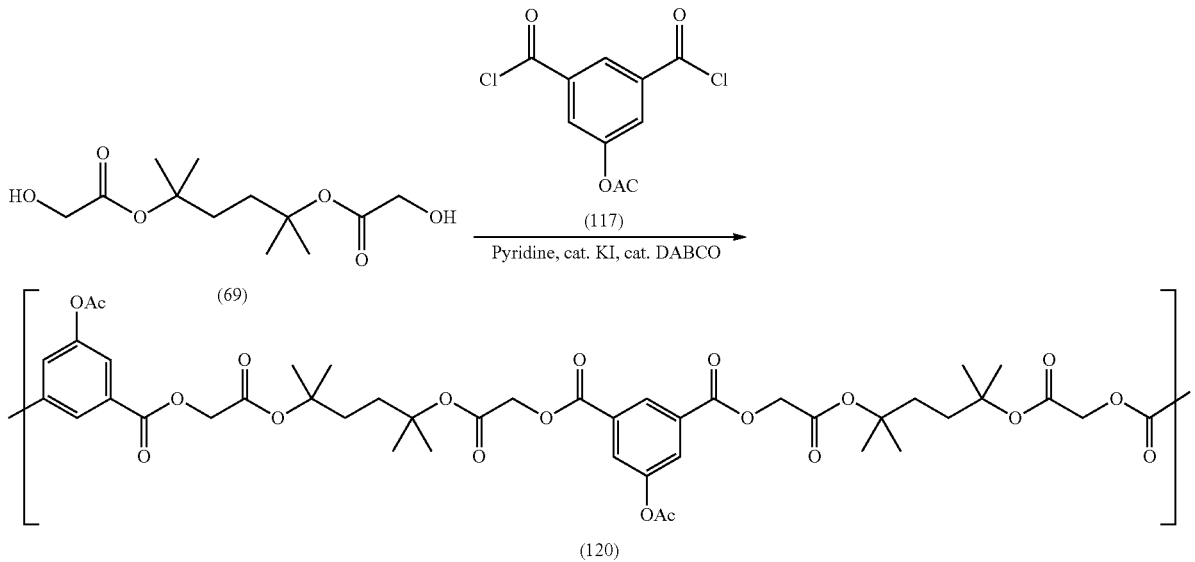

2,5-Dimethylhexane-2,5-diylbis(2-hydroxyacetate)/ 5-acetoxy isophthaloyl chloride terpolymer (120)

A solution of 2,5-dimethylhexane-2,5-diylbis(2-hydroxyacetate) (69) (0.997 g, 3.8 mmol), 5-acetoxy isophthaloyl chloride (117) (1.044 g, 4.0 mmol), a catalytic amount of 1,4-diazabicyclo[2.2.2]octane, and a catalytic amount of potassium iodide in 20 mL of pyridine was brought to 50° C. while stirring under nitrogen. After 24 hours, butanediol (0.072 g, 0.8 mmol) diluted in 10 mL of pyridine was added to the reaction mixture using a syringe pump over 8 hours. The solution was then quenched in 200 mL of cold 1N hydrochloric acid. The polymer precipitate is collected by filtration, redissolved in tetrahydrofuran, and precipitated in 100 mL of cold 1N hydrochloric acid. The polymer is then collected by filtration and dried under high vacuum. The polymer was found to have a molecular weight of ~14,000 g/mol by GPC.

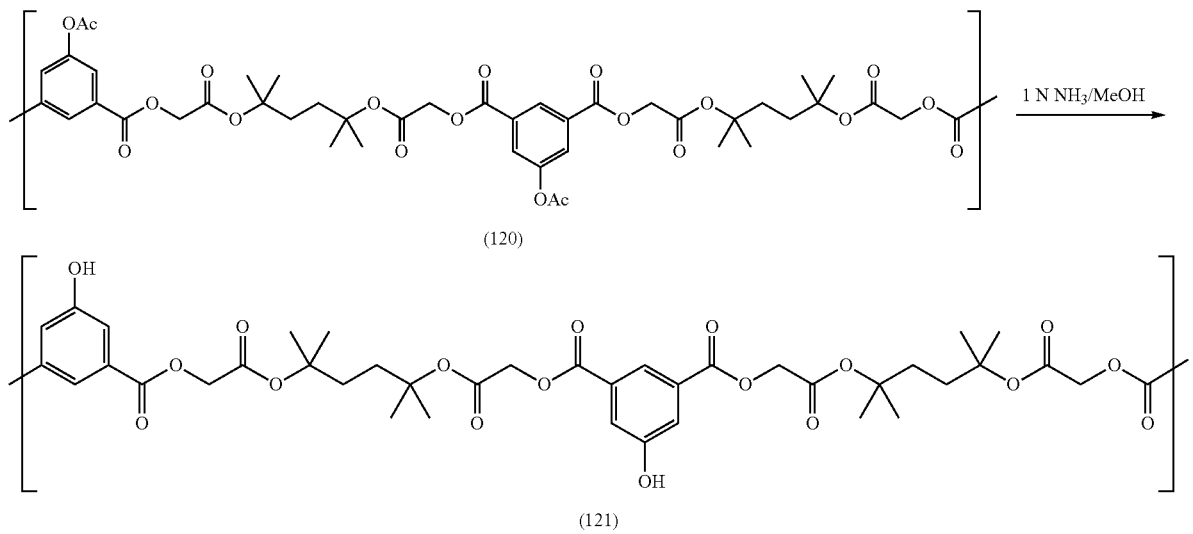

2,5-Dimethylhexane-2,5-diyl bis(2-hydroxyacetate)/5-hydroxyisophthaloyl dichloride terpolymer (121)

To a solution of methanolic ammonia (20 mL, 1 N), polymer (120) dissolved in 5 mL tetrahydrofuran was added and the solution was stirred for two hours. The polymer was then precipitated in 100 mL of cold 1 N hydrochloric acid and collected by filtration. The polymer was then dried under high vacuum and was found to have a molecular weight of ~7,000 g/mol by GPC.

Example 15

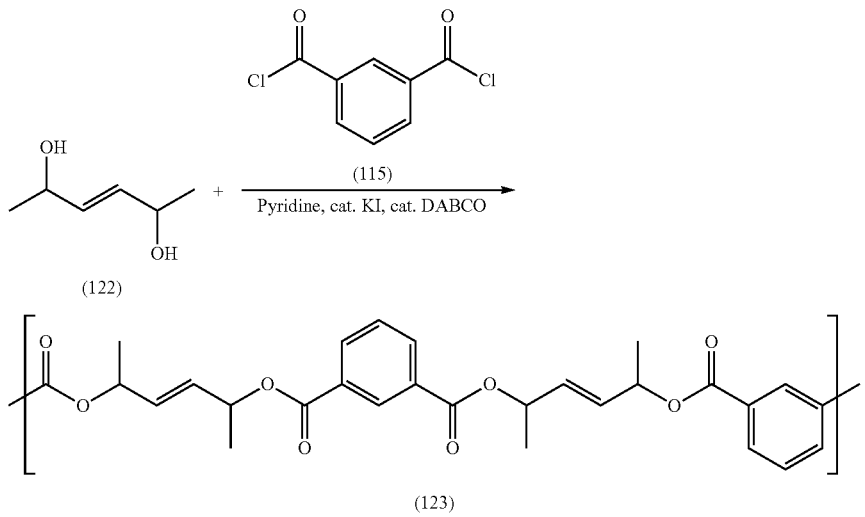

(E)-Hex-3-ene-2,5-diol/isophthaloyl chloride copolymer (123)

A solution of (E)-hex-3-ene-2,5-diol (122) (0.441 g, 3.8 mmol), isophthaloyl chloride (115) (0.812 g, 4.0 mmol), a catalytic amount of 1,4-diazabicyclo[2.2.2]octane, and a catalytic amount of potassium iodide in 20 mL of pyridine was brought to 50° C. while stirring under nitrogen. After 24 hours, butanediol (0.072 g, 0.8 mmol) diluted in 10 mL of pyridine was added to the reaction mixture using a syringe pump over 8 hours. The solution was then quenched in 200 mL of cold 1N hydrochloric acid. The polymer precipitate is collected by filtration, redissolved in tetrahydrofuran, and precipitated in cold 100 mL of cold 1N hydrochloric acid. The polymer is then collected by filtration and dried under high vacuum. The polymer was found to have a molecular weight of ~12,000 g/mol by GPC.

Example 16

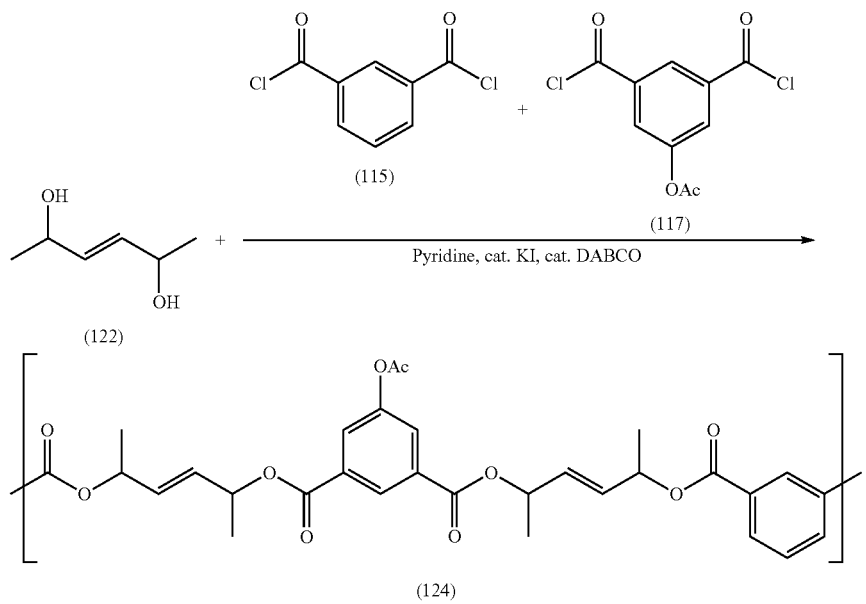

(E)-Hex-3-ene-2,5-diol/isophthaloyl chloride/5-acetoxy isophthaloyl chloride terpolymer (124)

A solution of (E)-hex-3-ene-2,5-diol (122) (0.441 g, 3.8 mmol), isophthaloyl chloride (115) (0.406 g, 2.0 mmol), 5-acetoxy isophthaloyl chloride (117) (0.522 g, 2.0 mmol), a catalytic amount of 1,4-diazabicyclo[2.2.2]octane, and a catalytic amount of potassium iodide in 20 mL of pyridine was brought to 50° C. while stirring under nitrogen. After 24 hours, butanediol (0.072 g, 0.8 mmol) diluted in 10 mL of pyridine was added to the reaction mixture using a syringe pump over 8 hours. The solution was then quenched in 200 mL of cold 1N hydrochloric acid. The polymer precipitate is collected by filtration, redissolved in tetrahydrofuran, and precipitated in 100 mL of cold 1N hydrochloric acid. The polymer is then collected by filtration and dried under high vacuum. The polymer was found to have a molecular weight of ~12,000 g/mol by GPC.

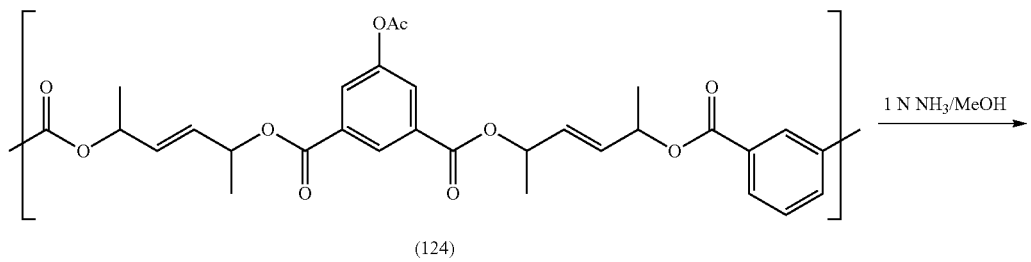

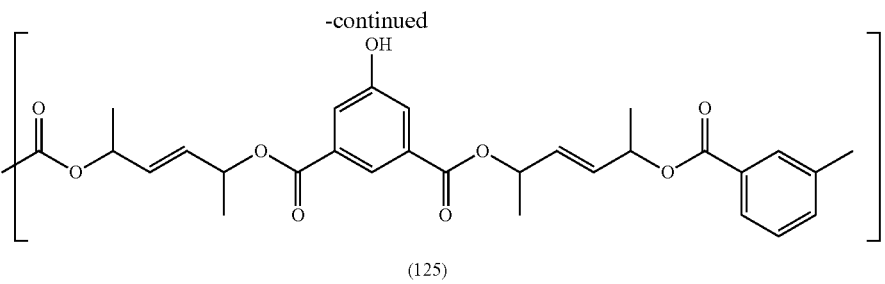

(125)

(E)-Hex-3-ene-2,5-diol/isophthaloyl chloride/5-hydroxyisophthaloyl dichloride terpolymer (125)

To a solution of methanolic ammonia (20 mL, 1 N), polymer (124) dissolved in 5 mL tetrahydrofuran is added and the solution is stirred for two hours. The polymer was then precipitated in 100 mL of cold 1 N hydrochloric acid and collected by filtration. The polymer was then dried under high vacuum and was found to have a molecular weight of ~5,000 g/mol by GPC.

Example 17

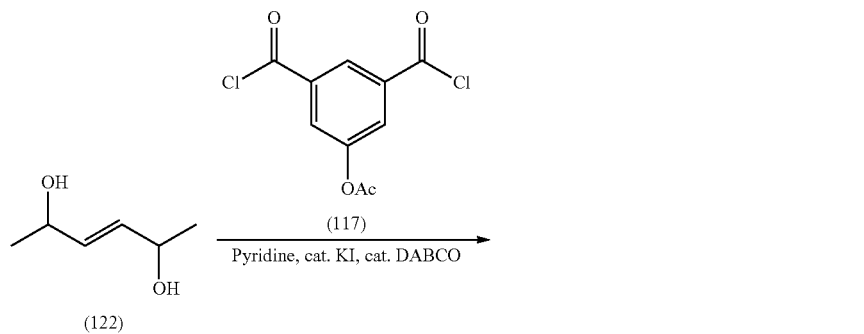

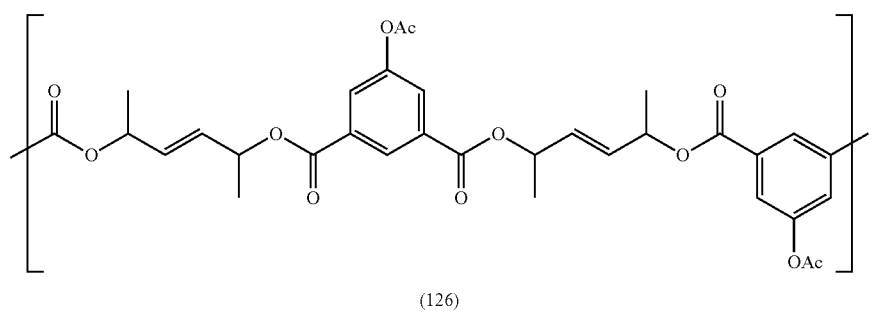

(126)

(E)-Hex-3-ene-2,5-diol/5-acetoxy isophthaloyl chloride terpolymer (126)

A solution of 2(E)-hex-3-ene-2,5-diol (122) (0.441 g, 3.8 mmol), 5-acetoxy isophthaloyl chloride (117) (1.044 g, 4.0 mmol), a catalytic amount of 1,4-diazabicyclo[2.2.2]octane, and a catalytic amount of potassium iodide in 20 mL of pyridine was brought to 50° C. while stirring under nitrogen. After 24 hours, butanediol (0.072 g, 0.8 mmol) diluted in 10 mL of pyridine was added to the reaction mixture using a syringe pump over 8 hours. The solution was then quenched in 200 mL of cold 1N hydrochloric acid. The polymer precipitate was collected by filtration, redissolved in tetrahydrofuran, and precipitated in 100 mL of cold 1N hydrochloric acid. The polymer is then collected by filtration and dried under high vacuum. The polymer was found to have a molecular weight of ~12,000 g/mol by GPC.

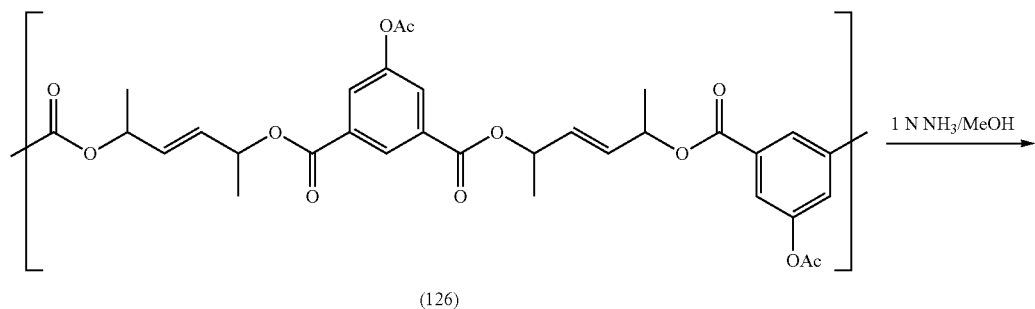

(126)

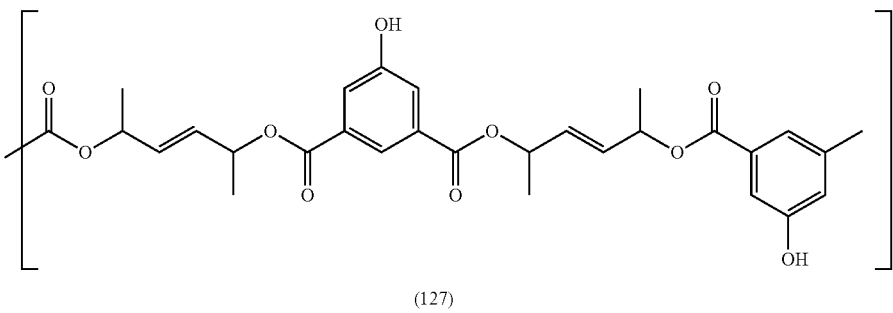

(127)

(E)-Hex-3-ene-2,5-diol/5-hydroxyisophthaloyl dichloride terpolymer (127)

To a solution of methanolic ammonia (20 mL, 1 N), polymer (126) dissolved in 5 mL tetrahydrofuran is added and the solution is stirred for two hours. The polymer was then precipitated in 100 mL of cold 1 N hydrochloric acid and collected by filtration. The polymer was then dried under high vacuum and was found to have a molecular weight of ~5,000 g/mol by GPC.

Example 18

Hex-3-yne-2,5-diol/terephthaloyl chloride copolymer (21)

A solution of 2hex-3-yne-2,5-diol (128) (1.084 g, 9.5 mmol), terephthaloyl chloride (129) (2.030 g, 10.0 mmol), a catalytic amount of 1,4-diazabicyclo[2.2.2]octane, and a catalytic amount of potassium iodide in 40 mL of pyridine is brought to 50° C. while stirring under nitrogen. After 24 hours, butanediol (0.072 g, 0.8 mmol) diluted in 10 mL of pyridine was added to the reaction mixture using a syringe pump over 8 hours. The solution was then quenched in cold hydrochloric acid (200 mL, 1 N). The polymer precipitate is collected by filtration, redissolved in tetrahydrofuran, and

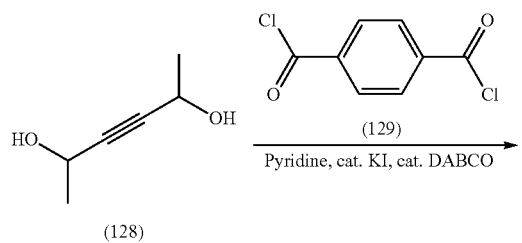

(128)

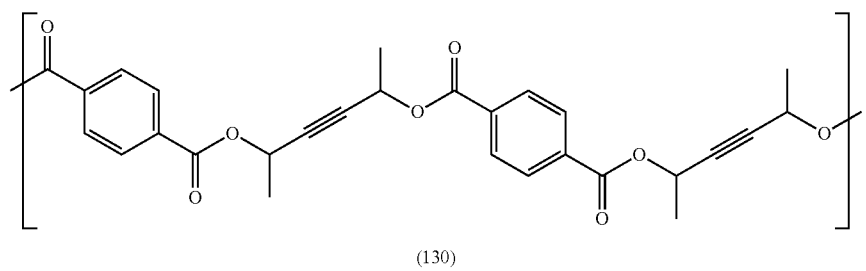

(130)

precipitated in 200 mL of cold 1N hydrochloric acid. The polymer is then collected by filtration and dried under high vacuum. The polymer was found to have a molecular weight of ~12,000 g/mol by GPC.

Other polymers can be synthesized in similar fashion:

We claim:

1. A polymer comprising a first component and a second component, said first component being photolytically stable and acid-stable, wherein said first component is —CO-$G^5$-

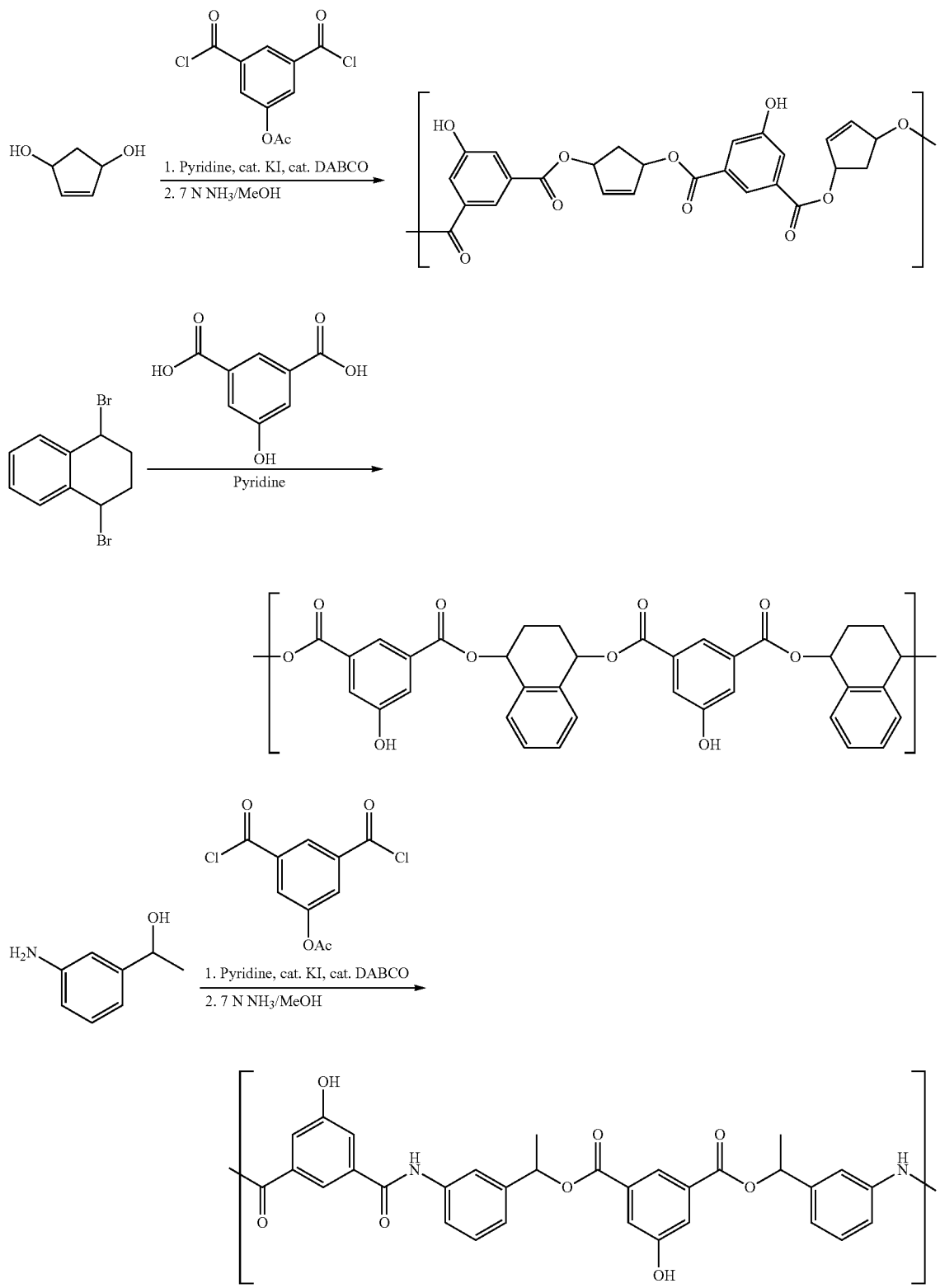

CO—, wherein $G^5$ is selected from an alkane, a fluoroalkane, an arene, a fluoroarene, a diaryl ether and a diaryl;

and said second component consisting of a unit chosen from units of the formulae

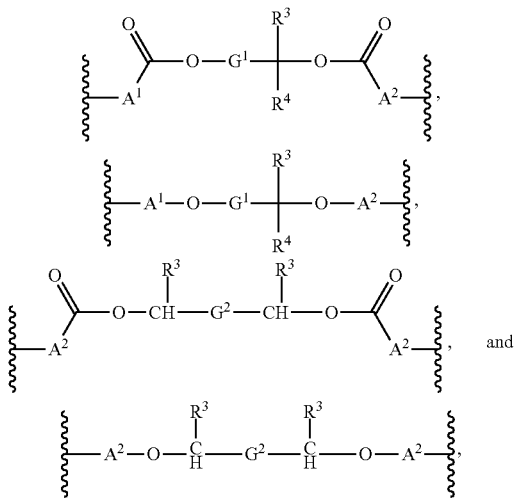

wherein
$R^3$ and $R^4$ are independently chosen from $(C_1-C_6)$alkyl, or $R^3$ and $R^4$ together with the carbon to which they are attached form a cyclopentane or cyclohexane ring;
$G^1$ is selected from $(C_1-C_{20})$hydrocarbon and fluoro$(C_1-C_{20})$hydrocarbon;
$G^2$ is an unsaturated $(C_2-C_{10})$hydrocarbon; and
$A^1$ and $A^2$ are independently chosen from $(C_1-C_{20})$hydrocarbon, fluoro$(C_1-C_{20})$hydrocarbon, $(C_1-C_{20})$hydrocarbon ether, $(C_1-C_6)$oxaalkyl, $(C_1-C_6)$thiaalkyl, $(C_1-C_6)$azaalkyl and acylated$(C_1-C_6)$azaalkyl, each of the foregoing terminating in —O—, —S— or —NR$^9$—, wherein $R^9$ is H, $(C_1-C_6)$alkyl or benzyl.

2. A polymer according to claim 1 wherein said second component is a unit chosen from units of the formulae

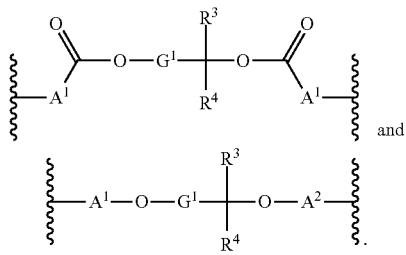

3. A polymer according to claim 2 wherein $R^3$ and $R^4$ are both methyl.

4. A polymer according to claim 2 wherein $G^1$ is chosen from $(C_1-C_6)$alkyl, methylcyclohexyl and methylcyclohexenyl.

5. A polymer according to claim 1 wherein said second component is a unit chosen from units of the formulae

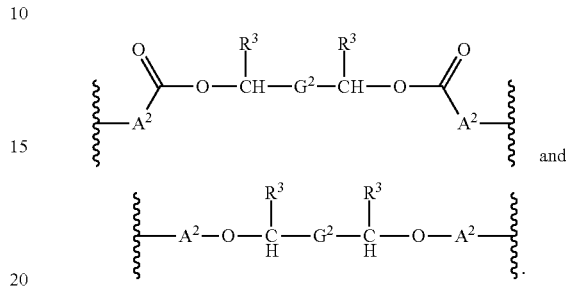

6. A polymer according to claim 5 wherein $R^3$ is methyl.

7. A polymer according to claim 5 wherein $G^2$ is chosen from phenylene, ethynyl and ethenyl.

8. A polymer according to claim 2 wherein $A^1$ and $A^2$ are chosen from amino-terminal or hydroxy-terminal-$(C_1-C_4)$ alkylene-, —$(C_2-C_4)$azaalkylene-, —$(C_2-C_4)$N-acetylazaalkylene-, 4-methylbenzyloxymethylene, 4-methylbenzyloxy ethylene, 4-methylbenzyl and phenylethenyl.

9. A polymer according to claim 1, wherein the first component is

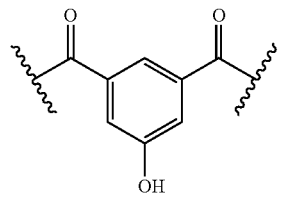 [SMILES: *C(=O)c1cc(O)cc(C(*)=O)c1]

and the second component is

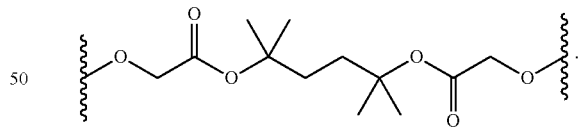

* * * * *